US006776489B2

(12) United States Patent
Suzuki

(10) Patent No.: US 6,776,489 B2
(45) Date of Patent: Aug. 17, 2004

(54) COLOR SEPARATION/COMBINATION OPTICAL SYSTEM, IMAGE DISPLAY OPTICAL SYSTEM, AND PROJECTION TYPE IMAGE DISPLAY APPARATUS

(75) Inventor: Ryuji Suzuki, Saitama (JP)

(73) Assignee: Canon Kabushiki Kaisha, Ohta-Ku (JP)

( * ) Notice: Subject to any disclaimer, the term of this patent is extended or adjusted under 35 U.S.C. 154(b) by 0 days.

(21) Appl. No.: 10/283,745

(22) Filed: Oct. 30, 2002

(65) Prior Publication Data

US 2003/0081180 A1 May 1, 2003

(30) Foreign Application Priority Data

Oct. 30, 2001 (JP) ....................................... 2001-333078

(51) Int. Cl.[7] ........................ G02B 21/14; G02B 21/16; G02B 21/18; G02B 21/26; G02F 1/1335
(52) U.S. Cl. .......................... 353/20; 353/56; 353/58; 353/60; 349/9; 349/161
(58) Field of Search .............................. 353/20, 52, 56, 353/58, 60; 349/9, 161

(56) References Cited

U.S. PATENT DOCUMENTS

| 6,139,155 | A | * | 10/2000 | Takizawa | 353/57 |
| 6,183,091 | B1 | | 2/2001 | Johnson et al. | 353/20 |
| 6,447,121 | B1 | * | 9/2002 | Woo | 353/52 |
| 6,523,959 | B2 | * | 2/2003 | Lee et al. | 353/52 |
| 6,572,231 | B1 | * | 6/2003 | Watanabe | 353/58 |

FOREIGN PATENT DOCUMENTS

| JP | 6-194621 | 7/1994 | ............. G02F/1/13 |
| JP | 11-305203 | 11/1999 | ......... G02F/1/1333 |

OTHER PUBLICATIONS

U.S. patent application Publication US 2002/0191158 A1, Koyama et al., Pub date: Dec. 2002, Projection Type Image Display Apparatus, 353/31.*

* cited by examiner

Primary Examiner—Russell Adams
Assistant Examiner—Melissa J Koval
(74) Attorney, Agent, or Firm—Morgan & Finnegan, LLP

(57) ABSTRACT

A color separation/combination optical system according to the present invention comprises of a polarization beam splitter which performs at least one of separation of illumination light from a light source into light components for a plurality of colors and combination of light components for modulated by a plurality of image display elements, a plurality of temperature varying units which are disposed in opposition to or in contact with different surfaces of the polarization beam splitter and change the temperature of the polarization beam splitter, a temperature sensor which detects the temperature of the polarization beam splitter. The system also includes a control circuit controls the temperature varying units based on the temperature detected by the temperature sensor to prevent the action of birefringence caused by internal stress in an optical glass material constituting the polarization beam splitter from hindering a desired action of polarized light separation.

30 Claims, 18 Drawing Sheets

COLOR SEPARATION/COMBINATION OPTICAL SYSTEM, IMAGE DISPLAY OPTICAL SYSTEM, AND PROJECTION TYPE IMAGE DISPLAY APPARATUS

BACKGROUND OF THE INVENTION

1. Field of the Invention

The present invention relates to a color separation/combination optical system, an image display optical system, and a projection type image display apparatus which use polarization beam splitters to separate illumination light into respective color light components and/or to combine color light components modulated by image display elements.

2. Description of the Related Art

A projection type image display apparatus having a combination of reflection type liquid crystal display elements and polarization beam splitters is disclosed, for example, in U.S. Pat. No. 6,183,091. As shown in FIG. 19, the projection type image display apparatus according to that U.S. Pat. is configured to have four polarization beam splitters 218, 220, 224, 228 and four color selecting phase plates 216, 226, 234, 236.

The color selecting phase plate has a function of converting the direction of polarization of light in a predetermined wavelength area by 90 degrees in the wavelength region of visible light but not converting the direction of light in the other wavelength areas.

In the projection type image display apparatus according to the aforementioned U.S. Patent, linearly polarized light (S-polarized light) from a light source 200 is incident on the first color selecting phase plate 216 which rotates only the polarization direction of light component for blue (B") by 90 degrees (resulting in P-polarized light) before incidence on the first polarization beam splitter 218. The first polarization beam splitter 218 transmits the light component for blue which is the P-polarized light and reflects light components for green (G") and red (R") (Yellow light (Y")) which is the S-polarized light except the light component for blue, thereby performing color separation.

The light component for blue (P-polarized light) passes through the second polarization beam splitter 220 and reaches a reflection type liquid crystal display element 222 for blue. The light components for green and red are incident on the second color separating phase plate 226 which converts only the polarization direction of the light component for green by 90 degrees (resulting in P-polarized light) before incident on the third polarization beam splitter 228. The third polarization beam splitter 228 transmits the light component for green which is the P-polarized light and reflects the light component for red which is the S-polarized light to perform color separation, so that the light component for green and the light component for red reach reflection type liquid crystal display elements 232 and 230 for green and red, respectively.

The P-polarized light component for blue modulated to image light by the reflection type liquid crystal display element 222 passes through the second polarization beam splitter 220 and returns toward the light source 200. The S-polarized light component thereof is reflected by the second polarization beam splitter 220 and serves as projection light.

The S-polarized light component for red modulated to image light by the reflection type liquid crystal display element 230 is reflected by the third polarization beam splitter 228 and returns toward the light source 200. The P-polarized light component thereof passes through the third polarization beam splitter 228 and serves as projection light.

The P-polarized light component for green modulated to image light by the reflection type liquid crystal display element 232 passes through the third polarization beam splitter 228 and returns toward the light source 200. The S-polarized light component thereof is reflected by the third polarization beam splitter 228 and serves as projection light.

The projection light components for green and red are incident on the third color selecting phase plate 234 which rotates the polarization direction of the light component for green by 90 degrees to make both the light component for green and the light component for red P-polarized before transmission through the fourth polarization beam splitter 224. On the other hand, the light component for blue which is the S-polarized light is reflected by the fourth polarization beam splitter 224. The fourth color selecting phase plate 236 converts only the polarization direction of the light component for blue by 90 degrees and the resulting P-polarized light emanates therefrom. The light component for green and the light component for red which are the P-polarized light pass through the fourth color selecting phase plate 236. Thus, the light components for RGB are combined into one and projected on a projection surface such as a screen, not shown, by a projection lens 238.

In this configuration, it is expected that the illumination light from the light source 200 heats the reflection type liquid crystal display elements 222, 230, and 232.

No problem arises if each reflection type liquid crystal display element is uniformly heated. In general, however, a temperature difference is often caused between the central portion and the peripheral portion of the reflection type liquid crystal display element such that the central portion of the reflection type liquid crystal display element is at a higher temperature than the peripheral portion.

In this case, since liquid crystal has V-T (voltage-transmittance) characteristics and transmittance in each color varies with temperature, the transmittance variations between the central portion and the peripheral portion of the reflection type liquid crystal display element cause uneven colors (color variations) in a projected image to present the disadvantage of reduced quality of the projected image.

As a measure to achieve a uniform temperature at the reflection type liquid crystal display elements, Japanese Patent Application Laid-Open No. 6-194621 proposes a method in which a cooling fan is provided around each reflection type liquid crystal display element to directly supply a cooling wind to the reflection type liquid crystal display element to minimize a temperature difference between the central portion and the peripheral portion of the reflection type liquid crystal display element, thereby reducing color variations in a projected image.

In addition, Japanese Patent Application Laid-Open No. 11-305203 proposes a method in which a heater is provided around a reflection type liquid crystal display element to heat the element to minimize a temperature difference between the central portion and the peripheral portion of the reflection type liquid crystal display element, thereby reducing color variations in a projected image.

Components which are expected to experience heating due to the illumination light include not only the reflection type liquid crystal display elements but also the polarization beam splitters. When the polarization beam splitter has a temperature difference therein, internal stress is produced in an optical glass material constituting the polarization beam splitter. As a result, birefringence which converts linearly polarized light incident thereon into elliptically polarized light (that is, produces an undesired polarized light component) under the influence of photoelasticity, so that a desired effect of polarized light separation (reflection and transmission) is not attained with reliability.

Consequently, there exists a problem that so-called light leakage which is not subjected to a desired polarized light separation effect reaches a projection surface to reduce contrast and quality of a projected image.

SUMMARY OF THE INVENTION

It is an object of the present invention to provide a color seperation/combination optical system, an image display optical system, and a projection type image display apparatus which allow a uniform temperature at the polarization beam splitters.

To achieve the aforementioned object, the present invention provides a color separation/combination optical system comprised of a polarization beam splitter which is formed in a prism shape having a polarized light separating surface and performs at least one of separation of illumination light from a light source into light components for a plurality of colors and combination of light components for a plurality of colors modulated respectively by a plurality of image display elements, a plurality of temperature varying units which are disposed in opposition to or in contact with different surfaces of the polarization beam splitter, and convert the temperature of the polarization beam splitter, a temperature sensor which detects the temperature of the polarization beam splitter, and a control circuit which controls the temperature varying units based on the temperature detected by the temperature sensor.

For example, the plurality of temperature sensors may detect the temperature of the polarization beam splitter changed by the plurality of temperature varying units, independently, to control the respective temperature varying units such that the detection results of the plurality of temperature sensors are substantially equal to each other.

In addition, the temperature varying units may be controlled such that the temperature of the polarization beam splitter is near the controlled temperature for image display elements.

As for the temperature varying units, it is possible to use a cooling unit such as a cooling fan or a Peltier element having a surface which radiates or absorbs heat in contact with the polarization beam splitter, or a heating unit such as a heater, a hot-air fan, or a Peltier element having a surface which generates heat in contact with the polarization beam splitter.

When a cooling fan is used as one of a plurality of cooling units, the cooling fan need not be dedicated to cooling of the polarization beam splitter, and for example, a cooling fan for cooling the image display elements may be used.

In addition, when a heating unit is used, the following condition may be satisfied:

$T1 \leq T2$ where T1 represents the temperature of the polarization beam splitter heated by the illumination light from the light source and T2 represents the heating temperature of the heating units.

A detailed configuration of the color separation/combination optical system, image display optical system, and projection type image display apparatus of the invention, the above and other objects and features of the invention will be apparent from the embodiments, described below.

DESCRIPTION OF THE PREFERRED EMBODIMENTS

Hereinafter, preferred embodiments of the invention will be described in detail with reference to the drawings.

Figure 1:
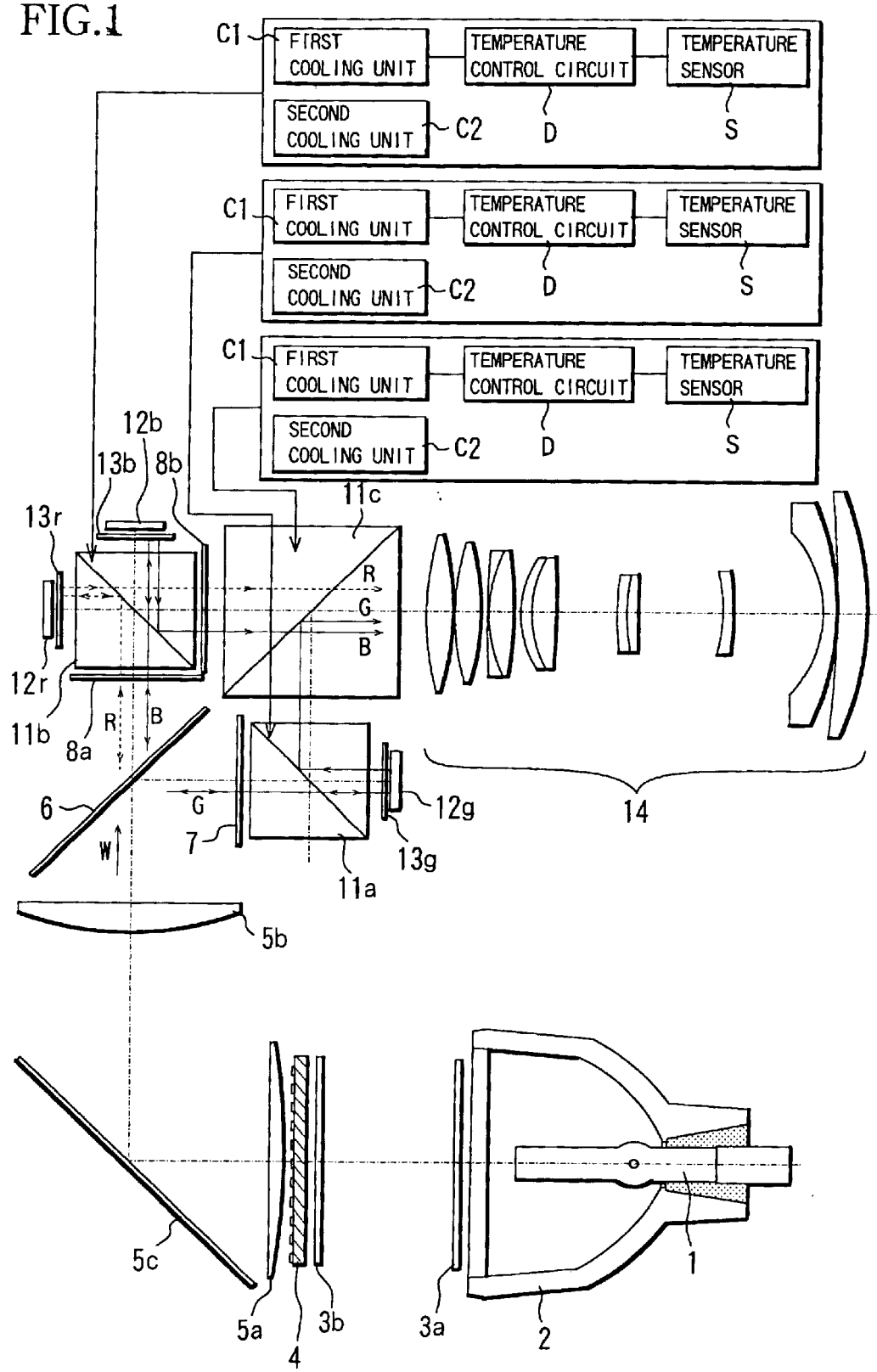
FIG. 1 shows the configuration of a projection type image display apparatus which is Embodiment 1 of the present invention.

FIG. 1 shows the configuration of an optical system of a projection type image display apparatus which is Embodiment 1 of the present invention.

In FIG. 1, reference numeral 1 shows a light source which emits white light in a continuous spectrum, and reference numeral 2 shows a reflector which collects the light from the light source 1 in a predetermined direction. Reference numeral 3a shows the first fly eye lens which has rectangular lenses arranged in a matrix form, and reference numeral 3b shows the second fly eye lens which is formed of an array of lenses corresponding to the individual lenses of the first fly eye lens 3a. Reference numeral 4 shows a polarization converting element which converts non-polarized light into polarized light in a predetermined direction, 5a a condenser lens, 5b a field lens, and 5c a mirror.

Reference numeral 6 shows a dichroic mirror which transmits light components in wavelength areas of blue (B) and red (R) and reflects a light component in a wavelength area of green (G). Reference numeral 7 shows a color filter which partially cuts a light component in the wavelength area between those for green and red.

Reference numeral 8 is the first color selecting phase plate which converts the polarization direction of the light the component for red by 90 degrees and does not convert the polarization direction of the light component for blue. Reference numeral 8b shows the second color selecting phase plate which converts the polarization direction of the light component for blue by 90 degrees and does not convert the polarization direction of the light component for red.

Reference numerals 11a, 11b, 11c show the first, second and third polarization beam splitters, each of which has a polarized light separating surface for transmitting P-polarized light and reflecting S-polarized light. Each of these polarization beam splitters 11a, 11b, 11c is formed by bonding a pair of optical glass pieces in a triangular prism shape such that the polarized light separating surface made of a multilayer film is formed on the bonding surface.

Reference numerals 12r, 12g, 12b show a reflection type liquid crystal display element for red, a reflection type liquid crystal display element for green, and a reflection type liquid crystal display element for blue, respectively, each of which reflects and modulates incident light and emits the modulated image light (that is, display an image).

These reflection type liquid crystal display elements 12r, 12g, 12b are connected to a drive circuit, not shown. The driver circuit is supplied with image information from an image information supply apparatus such as a personal computer, a television, a VCR, or a DVD player, not shown. The drive circuit drives the reflection type liquid crystal display element based on the image information to display an image for each color. In this manner, an image display system is implemented.

Reference numerals 13g, 13r, 13b show the first quarter-wave plate for green, the second quarter-wave plate for red, and the third quarter-wave plate for blue, respectively. Reference numeral 14 shows projection lenses.

The whole optical system from the light source 1 to the projection lenses 14 serves as a projection type image display optical system, and of these components, and the dichroic mirror 6 to the third polarization beam splitter 11c serve as a color separation/combination optical system.

Illumination light (white light) emanating from the light source 1 passes through the first fly eye lens 3a and the second fly eye lens 3b and is incident on the polarization converting element 4 which converts the light into P-polarized light. The illumination light having been converted into the P-polarized light passes through the condenser lens 5a, is reflected by the mirror 5c, passes through the field lens 5b, and is incident on the dichroic mirror 6. The illumination light incident on the dichroic mirror 6 is separated into the light component for green and the light components for red and blue through reflection of the light component for green and transmission of the light components for red and blue.

The P-polarized light component for green reflected by the dichroic mirror 6 is incident on the first polarization beam splitter 11a through the color filter 7. The P-polarized light component for green passes through the polarized light separating surface of the first polarization beam splitter 11a and is incident on the reflection type liquid crystal display element 12g for green through the first quarter-wave plate 13g for green.

In this event, a small amount of S-polarized light mixed into the illumination light due to a limited value of the conversion efficiency of the polarization converting element 4 is reflected by the polarized light separating surface of the first polarization beam splitter 11a and removed from a main optical path.

When the P-polarized light component for green is incident on the reflection type liquid crystal display element 12g for green, the reflection type liquid crystal display element 12g has no effect on the incident light for black display. The incident light component for green is again incident on the first polarization beam splitter 11a through the first quarter-wave plate 13g, passes through the polarized light separating surface of the first polarization beam splitter 11a, and returns toward the light source 1.

For white display, the reflection type liquid crystal display element 12g for green rotates the polarization direction of the incident light by 90 degrees and thus the resulting S-polarized light emanates therefrom. The emanating light is again incident on the first polarization beam splitter 11a through the first quarter-wave plate 13g.

The light component for green changed into the S-polarized light is reflected by the polarized light separating surface of the first polarization beam splitter 11a, is incident on the third polarization beam splitter 11c, and reflected by the polarized light separating surface of the third polarization beam splitter 11c, and forms an image on a screen (projection surface), not shown, through the projection lenses 14.

On the other hand, the light components for red and blue passing through the dichroic mirror 6 are incident on the first color selecting phase plate 8a which converts the P-polarized light component for red into S-polarized light. The S-polarized light component for red and the P-polarized light component for blue are incident on the second polarization beam splitter 11b.

The light component for red incident on the second polarization beam splitter 11b as the S-polarized light is reflected by the polarized light separating surface of the second polarization beam splitter 11b and incident on the reflection type liquid crystal display element 12r for red through the second quarter-wave plate 13r.

When the S-polarized light component for red is incident on the reflection type liquid crystal display element 12r for red, the reflection type liquid crystal display element 12r for red has no effect on the incident light for black display. The incident S-polarized light component for red is again incident on the second polarization beam splitter 11b through the second quarter-wave plate 13r, reflected by the polarized light separating surface of the second polarization beam splitter 11b, and returns toward the light source 1.

For white display, the reflection type liquid crystal display element 12r for red rotates the polarization direction of the incident light by 90 degrees and thus the resulting P-polarized light emanates therefrom. The emanating light is again incident on the second polarization beam splitter 11b through the second quarter-wave plate 13r, passes through the polarized light separating surface of the second polarization beam splitter 11b, and is incident on the second color selecting phase plate 8b.

The second color selecting phase plate 8b has a function of converting the polarization direction of the light component for blue and has no effect on the light component for red.

Then, the P-polarized light component for red is incident on the third polarization beam splitter 11c and passes through the polarized light separating surface of the third polarization beam splitter 11c and forms an image on the screen, not shown, through the projection lenses 14.

The light component for blue incident on the second polarization beam splitter 11b as the P-polarized light passes through the polarized light separating surface of the second polarization beam splitter 11b and is incident on the reflection type liquid crystal display element 12b for blue through the third quarter-wave plate 13b.

When the P-polarized light component for blue is incident on the reflection type liquid crystal display element 12b for blue, the reflection type liquid crystal display element 12b for blue has no effect on the incident light for black display. The incident P-polarized light component for blue is again incident on the second polarization beam splitter 11b through the third quarter-wave plate 13b, passes through the polarized light separating surface of the second polarization beam splitter 11b, and returns toward the light source 1.

For white display, the reflection type liquid crystal display element 12b for blue rotates the polarization direction of the incident light by 90 degrees and thus the resulting S-polarized light emanates therefrom. The emanating light is again incident on the second polarization beam splitter 11b through the third quarter-wave plate 13b, is reflected by the polarized light separating surface of the second polarization beam splitter 11b, and is incident on the second color selecting phase plate 8b.

Since the second color selecting phase plate 8b has the function of converting the polarization direction of the light component for blue, the S-polarized light component for blue is converted to P-polarized light which is incident on the third polarization beam splitter 11c.

Then, the light component for blue incident on the third polarization beam splitter 11c passes through the polarized light separating surface of the third polarization beam splitter 11c and then forms an image on the screen, not shown, through the projection lenses 14.

In the projection type image display apparatus configured as above, the illumination light from the light source 1 generally heats the components which transmit or reflect the light. Thus, the polarization beam splitters 11a, 11b, 11c also are heated.

As for the distribution of temperature in each of the polarization beam splitters 11a, 11b, 11c, the whole polarization beam splitter is not at a uniform temperature but shows temperature distribution involving a temperature difference due to distribution of the illumination light (central light and peripheral light), the shape and volume of the polarization beam splitter, and the like.

Such a temperature difference in the polarization beam splitter produces internal stress in the optical glass material constituting the polarization beam splitter to result in birefringence which converts linearly polarized light incident thereon into elliptically polarized light under the influence of photoelasticity. Thus, an undesired polarized light component is incident on the polarized light separating surface which then cannot provide reflection or transmission with reliability (that is, the relationship between the reflection and transmission is not established). This causes light leakage through the polarized light separating surface to reach a projection surface (screen) to reduce contrast and quality of a projected image.

To address this, in the first embodiment, each of the polarization beam splitters 11a, 1b, 11c is provided with the first cooling unit C1 which is disposed in opposition to or in contact with a surface thereof, a temperature sensor S for detecting the temperature of a portion of the polarization beam splitter cooled by the first cooling unit C1, the second cooling unit C2 disposed in opposition to or in contact with a surface of the polarization beam splitter opposite to the surface of the beam splitter above which the first cooling unit C1 is disposed in opposition or in contact, and a temperature control circuit D which controls the first cooling unit C1 based on the detection result of the temperature sensor S, as shown in FIG. 1.

The embodiment is configured such that the first cooling unit C1 is controlled by the temperature control circuit D based on the temperature detected by the temperature sensor S and in accordance with a cooling temperature by the second cooling unit C2. Thus, substantially uniform temperature distribution can be achieved in each of the polarization beam splitters 11a, 11b, 11c to produce a projected image of high contrast and high quality.

Figure 2:
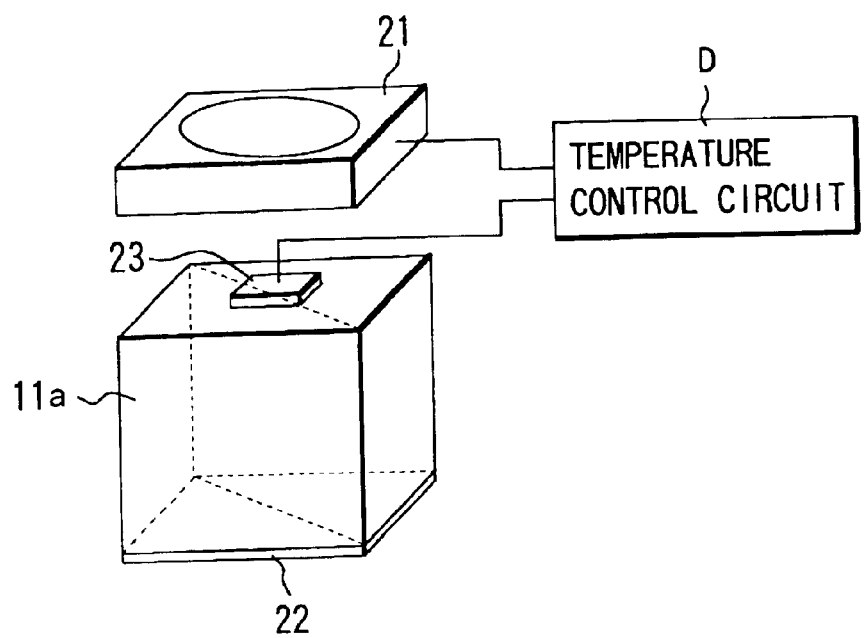
FIG. 2 shows the structure of a polarization beam splitter and its surroundings in Embodiment 1.

Next, a description is made for the reason why the first and second cooling units C1, C2 are provided and their specific configurations with reference to FIG. 2.

FIG. 2 shows only the polarization beam splitter 11a. Since the polarization beam splitters 11b, 11c have the same configurations, description thereof is omitted.

As shown in FIG. 2, the whole polarization beam splitter 11a is formed in a rectangular parallelepiped or cube shape. Reference numeral 21 shows a cooling fan (first cooling unit C1) which can cool the polarization beam splitter 11a. The cooling fan 21 is disposed in opposition to the surface of the polarization beam splitter 11a (top surface thereof in FIG. 2) through which the illumination light from the light source 1 does not pass (meaning incidence or exit).

Reference numeral 22 shows a radiating member (second cooling unit C2) which is in contact with the polarization beam splitter 11a to cool the polarization beam splitter 11a. The radiating member 22 is made of a material having a higher thermal conductivity than the polarization beam splitter 11a (for example, glass, sapphire, fluorite, or metal). The radiating member 22 is fixed in contact with the surface of the polarization beam splitter 11a (bottom surface thereof in FIG. 2) opposite to the surface above which the cooling fan 21 is disposed in opposition. The radiating member 22 may have a shape with an area substantially equal to or larger than the area of the bottom of the polarization beam splitter 11a, and may have various thicknesses.

Reference numeral 23 shows a temperature sensor (S) fixed in contact with the substantially central portion of the surface of the polarization beam splitter 11a above which the cooling fan 21 is disposed in opposition. The temperature sensor 23 detects the temperature of the polarization beam splitter 11a to output an electrical signal (temperature information) to the temperature control circuit D.

In this configuration, the two cooling units, or the cooling fan 21 and the radiating member 22, are provided for the following reason. While the polarization beam splitter 11a can be cooled only by the cooling fan 21, most of the cooling wind is received by a portion of the polarization beam splitter 11a around the surface above which the cooling fan 21 is disposed in opposition and thus that portion is best cooled. The polarization beam splitter 11a, however, has a rectangular parallelepiped or cube shape and a large volume, so that the whole polarization beam splitter 11a cannot be cooled sufficiently only by the cooling fan 21, and especially, a temperature difference tends to occur between that portion and the surface opposite to the surface above which the cooling fan 21 is disposed.

Thus, in the embodiment, the radiating member 22 is provided on the surface (bottom surface in FIG. 2) of the polarization beam splitter 11a opposite to the surface above which the cooling fan 21 is disposed to sufficiently cool the portion around the surface (bottom surface in FIG. 2).

Next, the control of the cooling fan 21 by the temperature control circuit D is described with reference to FIGS. 1, 2 and 3. Since the cooling control of the polarization beam splitters 11b, 11c is identical to that of the polarization beam splitter 11a, description is herein made only for the polarization beam splitter 11a.

Figure 3:
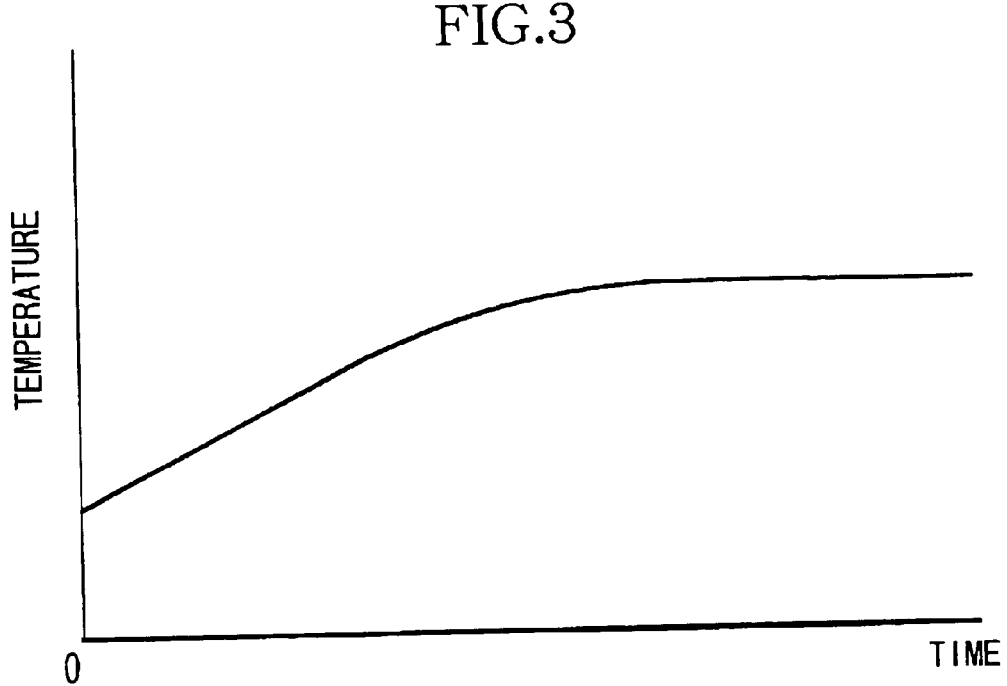
FIG. 3 is a graph showing the temperature characteristic of the polarization beam splitter provided with a radiating member in Embodiment 1.

FIG. 3 is a graph showing, on a time axis, the temperature of the side of the polarization beam splitter 11a on which the radiating member 22 is provided when the illumination light from the light source 1 is incident on the polarization beam splitter 11a.

As apparent from the graph, the temperature rises gradually up to a certain point in time and is substantially constant after that point on the side of the polarization beam splitter 11a on which the radiating member 22 is provided. This characteristic change is stored in the temperature control circuit D for the polarization beam splitter 11a.

Then, when the power of the image display apparatus is turned on, the light source 1 is lit. Simultaneously with the lighting of light source 1, the cooling fan 21 is driven for rotation by the temperature control circuit D to cool the portion of the polarization beam splitter 11a closer to the cooling fan 21.

In this event, the temperature control circuit D controls the rotation number of the cooling fan 21 such that the values from the temperature characteristic of the polarization beam splitter 11a obtained by the radiating member 22 shown in the graph of FIG. 3 substantially match the temperature values of the portion of the polarization beam splitter 11a closer to the cooling fan 21 detected by the temperature sensor 23.

With the repetition of such control, the temperature in the whole polarization beam splitter 11a is substantially equalized to prevent internal stress in the polarization beam splitter 11a and the resulting birefringence.

Substantially uniform distribution of the temperature in each of the three polarization beam splitters 11a, 11b, 11c in this manner can prevent the occurrence of light leakage through each polarized light separating surface to produce a projected image of high contrast and high quality.

Figure 4:
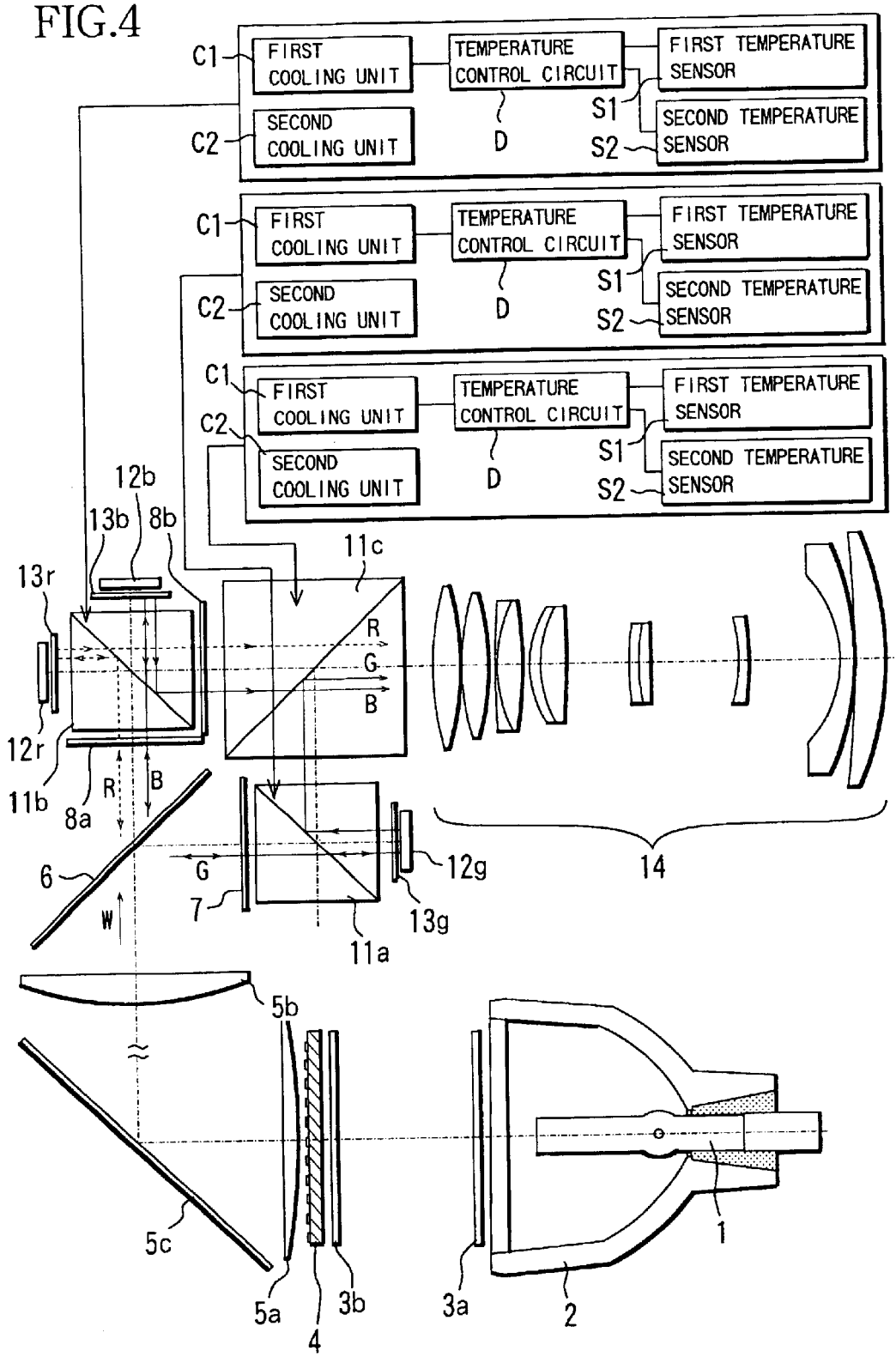
FIG. 4 shows the configuration of a projection type image display apparatus which is Embodiment 2 of the present invention.
Figure 5:
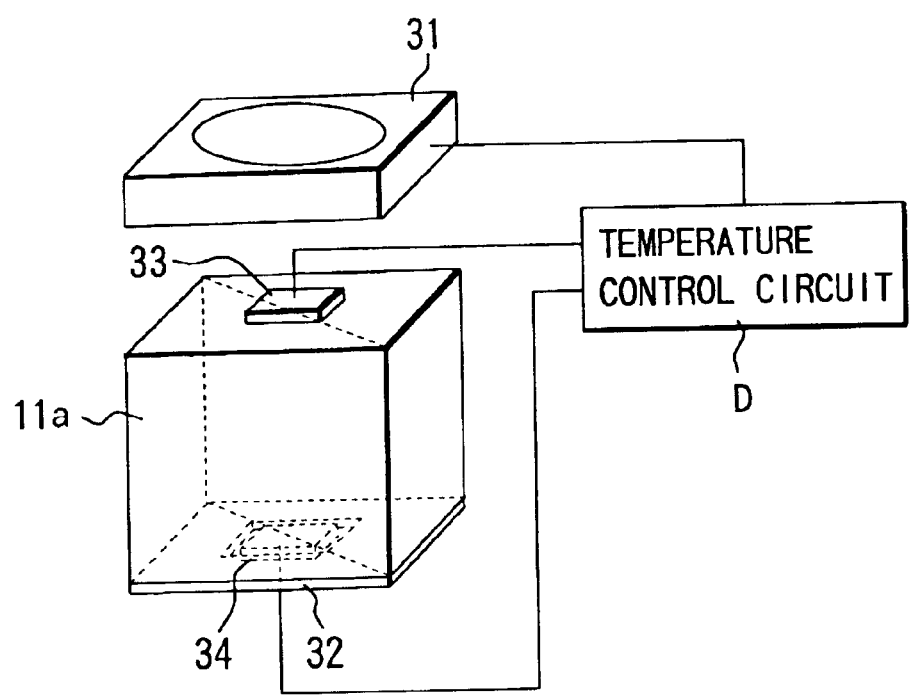
FIG. 5 shows the structure of a polarization beam splitter and its surroundings in Embodiment 2.

FIGS. 4 and 5 show the configuration of a projection type image display apparatus which is Embodiment 2 of the present invention. It should be noted that components common to both this Embodiment 2 and Embodiment 1 are designated with the same reference numerals as those in Embodiment 1 to omit description thereof.

In Embodiment 2, illumination light from a light source 1 heats polarization beam splitters 11a, 11b, 11c.

As for the distribution of temperature in each of the polarization beam splitters 11a, 11b, 11c, the whole polarization beam splitter is not at a uniform temperature but shows temperature distribution involving a temperature difference due to distribution of the illumination light (central light and peripheral light), the shape and volume of the polarization beam splitter, and the like.

Such a temperature difference in the polarization beam splitter produces internal stress in the optical glass material constituting the polarization beam splitter to result in birefringence which converts linearly polarized light incident thereon into elliptically polarized light under the influence of photoelasticity. Thus, an undesired polarized light component is incident on a polarized light separating surface which then cannot provide reflection or transmission with reliability (the relationship between the reflection and transmission is not established). This causes light leakage through the polarized light separating surface to reach a projection surface (screen) to reduce contrast and quality of a projected image.

To address this, in Embodiment 2, as shown in FIG. 4, each of the polarization beam splitters 11a, 11b, 11c is provided with the first cooling unit C1 which is disposed in opposition to or in contact with a surface thereof, the first temperature sensor S1 for detecting the temperature of a portion of the polarization beam splitter cooled by the first cooling unit C1, the second cooling unit C2 disposed in opposition to or in contact with a surface of the polarization beam splitter opposite to the surface of the beam splitter above which the first cooling unit C1 is disposed in opposition or in contact, the second temperature sensor S2 for detecting the temperature of a portion of the polarization beam splitter cooled by the second cooling unit C2, and a temperature control circuit D for controlling the first cooling unit C1 based on the detection results of the first and second temperature sensors S1, S2.

This Embodiment 2 is configured to control the first cooling unit C1 by the temperature control circuit D such that the cooling temperature detected by the first cooling unit C1 is substantially equal to the cooling temperature detected by the second cooling unit C2. Thus, substantially uniform temperature distribution can be achieved in each of the polarization beam splitters 11a, 11b, 11c to produce a projected image of high contrast and high quality.

Next, description is made for the reason why the first and second cooling units C1, C2 are provided and their specific configurations with reference to FIG. 5.

FIG. 5 shows only the polarization beam splitter 11a. Since the polarization beam splitters 11b, 11c have the same configurations, description thereof is omitted.

As shown in FIG. 5, the whole polarization beam splitter 11a is formed in a rectangular parallelepiped or cube shape. Reference numeral 31 shows a cooling fan (first cooling unit C1) which can cool the polarization beam splitter 11a. The cooling fan 31 is disposed in opposition to the surface of the polarization beam splitter 11a (top surface thereof in FIG. 5) through which the illumination light from the light source 1 does not pass (meaning incidence or exit).

Reference numeral 32 shows a radiating member (second cooling unit C2) which is in contact with the polarization beam splitter 11a to cool the polarization beam splitter 11a. The radiating member 32 is made of a material having a higher thermal conductivity than the polarization beam splitter 11a (for example, glass, sapphire, fluorite, or metal). The radiating member 32 is fixed in contact with a peripheral portion of the surface of the polarization beam splitter 11a (bottom surface thereof in FIG. 5) opposite to the surface above which the cooling fan 31 is disposed in opposition.

Reference numeral 33 shows the first temperature sensor (S1) which is fixed in contact with the substantially central portion of the surface of the polarization beam splitter 11a above which the cooling fan 31 is disposed in opposition. The temperature sensor 33 detects the temperature of the polarization beam splitter 11a to output an electrical signal (temperature information) to the temperature control circuit D. Reference numeral 34 shows the second temperature sensor (S2) which is fixed in contact with the substantially central portion of the surface of the polarization beam splitter 11a on which the radiating member 32 is provided. The temperature sensor 34 detects the temperature of the polarization beam splitter 11a to output an electrical signal (temperature information) to the temperature control circuit D.

In this configuration, the two cooling units, or the cooling fan 31 and the radiating member 32, are provided for the following reason. Similarly to Embodiment 1, while the polarization beam splitter 11a can be cooled only by the cooling fan 31, most of the cooling wind is received by a portion of the polarization beam splitter 11a around the surface above which the cooling fan 31 is disposed in opposition and thus that portion is best cooled. The polarization beam splitter 11a, however, has a rectangular parallelepiped or cube shape and a large volume, so that the whole polarization beam splitter 11a cannot be cooled sufficiently only by the cooling fan 31, in particularly, a temperature difference tends to occur between that portion and the surface opposite to the surface above which the cooling fan 31 is disposed.

Thus, in this Embodiment 2, the radiating member 32 is provided on the surface (bottom surface in FIG. 5) of the polarization beam splitter 11a opposite to the surface above which the cooling fan 31 is disposed to sufficiently cool a portion around the surface (bottom surface in FIG. 5).

Figure 6:
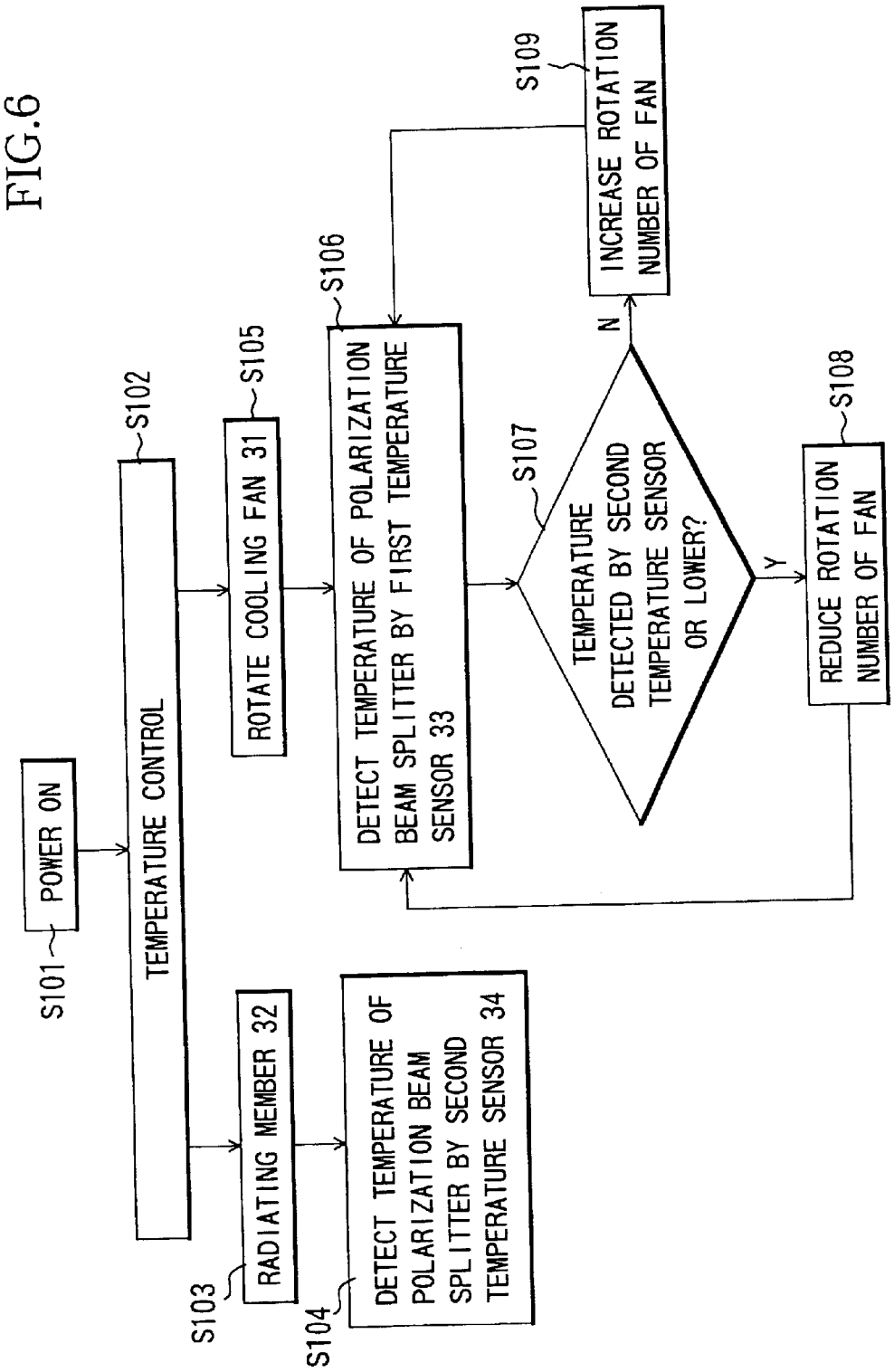
FIG. 6 is a flow chart for temperature control of the polarization beam splitter in Embodiment 2.

Next, the control of the cooling fan 31 by the temperature control circuit D is described with reference to a flow chart of FIG. 6, and FIGS. 4 and 5. Since the cooling control of the polarization beam splitters 11b, 11c is identical to that of the polarization beam splitter 11a, description is herein made only for the polarization beam splitter 11a.

Upon turn-on of the power of the image display apparatus (S101), the light source 1 is lit by a main control circuit consisting of a CPU or the like, not shown, responsible for control of the whole display apparatus. Next, the temperature control circuit D starts temperature control (S102), and the second temperature sensor 34 detects the temperature of the portion of the polarization beam splitter 11a closer to the radiating member 32 (S103, S104).

Meanwhile, the temperature control circuit D rotates the cooling fan 31 to cool the polarization beam splitter 11a (S105). In this event, the first temperature sensor 33 detects the temperature of the portion of the polarization beam splitter 11a closer to the cooling fan 31 (S106).

The polarization beam splitter 11a is gradually heated by the illumination light from the light source 1. When the temperature detected by the first temperature sensor 33 is equal to or lower than the temperature detected by the second temperature sensor 34 (S107), the temperature control circuit D reduces the rotation number of the cooling fan 31 to perform control for increasing the temperature of the portion of the polarization beam splitter 11a closer to the cooling fan 31 (S108). Then, the first temperature sensor 33 again detects the temperature of the polarization beam splitter 11a (S106).

When the temperature detected by the first temperature sensor 33 is above the temperature detected by the second temperature sensor 34 (S107), the temperature control circuit D increases the rotation number of the cooling fan 31 to perform control for reducing the temperature of the portion of the polarization beam slitter 11a closer to the cooling fan 31 (S109). Then, the first temperature sensor 33 again detects the temperature of the polarization beam splitter 11a (S106).

With the repetition of such control, the temperature in the whole polarization beam splitter 11 is substantially equalized to the temperature detected by the second temperature sensor 34 to prevent the occurrence of internal stress in the polarization beam splitter 11a and the resulting birefringence.

Substantially uniform distribution of the temperature in each of the three polarization beam splitters 11a, 11b, 11c in this manner can prevent the occurrence of light leakage through each polarized light separating surface to produce a projected image of high contrast and high quality.

The polarization beam splitter 11a has the same characteristic of temperature on a time axis as that described in FIG. 3 when the illumination light from the light source 1 is incident on the polarization beam splitter 11a and the heat in the polarization beam splitter 11 is radiated by the radiating member 32.

While Embodiments 1 and 2 employ the cooling fan as only one of the cooling units C1, C2, a cooling fan (preferably driven for constant speed rotation) may also be used as the other cooling unit.

Figure 7:
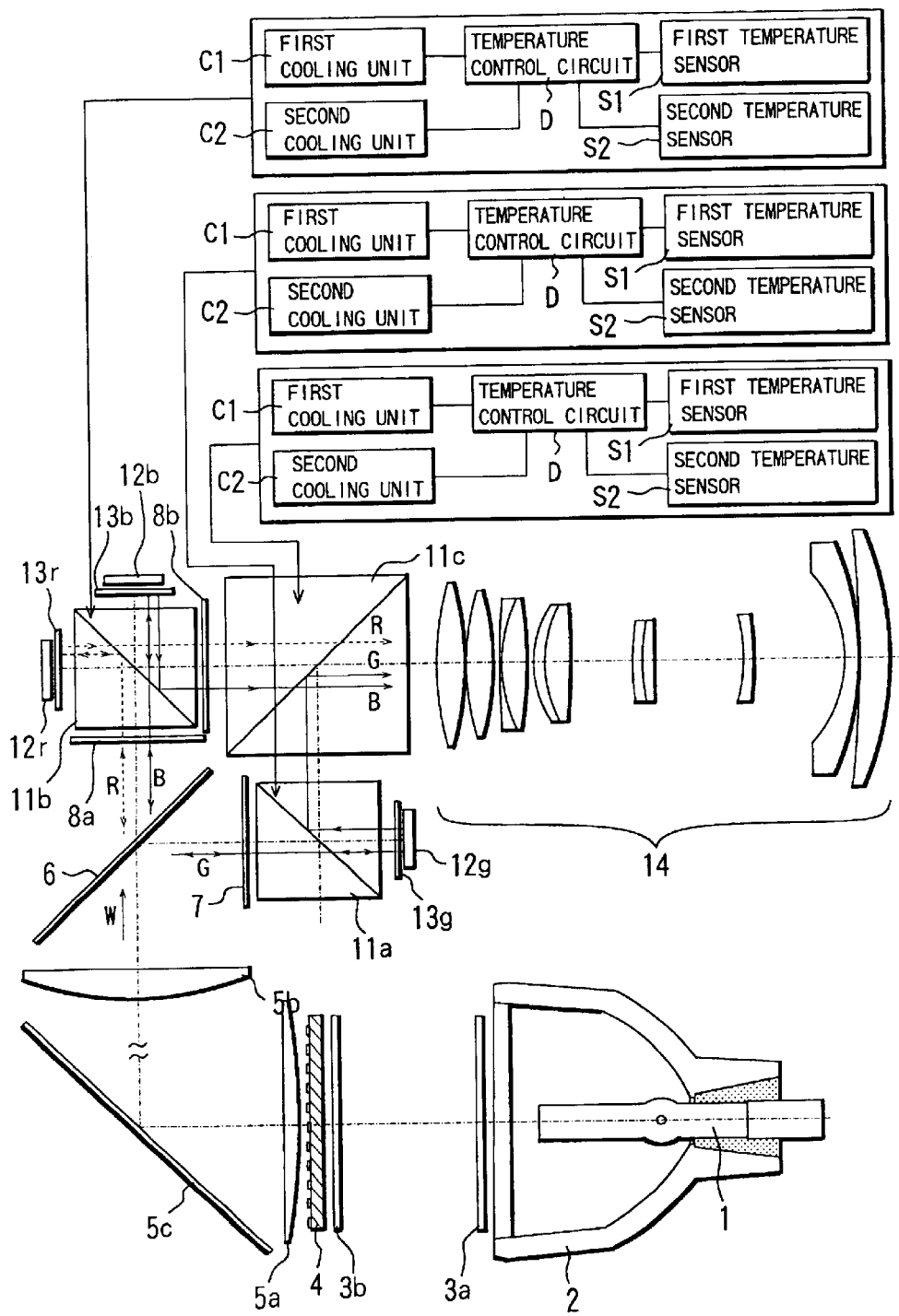
FIG. 7 shows the configuration of a projection type image display apparatus which is Embodiment 3 of the present invention.
Figure 8:
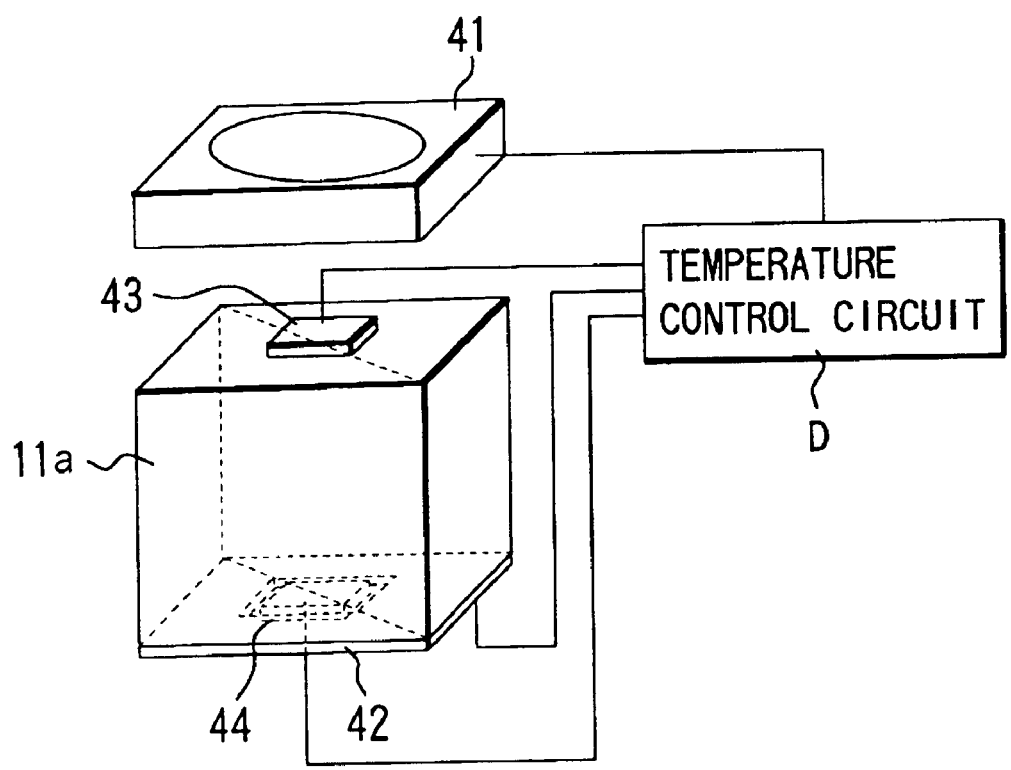
FIG. 8 shows the structure of a polarization beam splitter and its surroundings in Embodiment 3.

FIGS. 7 and 8 shows the configuration of a projection type image display apparatus which is Embodiment 3 of the present invention. It should be noted that components common to both this Embodiment 3 and Embodiment 1 are designated with the same reference numerals as those in Embodiment 1 to omit description thereof.

In this Embodiment 3, illumination light from a light source 1 heats polarization beam splitters 11a, 11b, 11c.

As for the distribution of temperature in each of the polarization beam splitters 11a, 11b, 11c, the whole polarization beam splitter is not at a uniform temperature but shows temperature distribution involving a temperature difference due to distribution of the illumination light (central light and peripheral light), the shape and volume of the polarization beam splitter, and the like.

Such a temperature difference in the polarization beam splitter produces internal stress in the optical glass material constituting the polarization beam splitter to cause birefringence which converts linearly polarized light incident thereon into elliptically polarized light under the influence of photoelasticity. Thus, an undesired polarized light component is incident on a polarized light separating surface which then cannot provide reflection or transmission with reliability (the relationship between the reflection and transmission is not established). This causes light leakage through the polarized light separating surface to reach a projection surface (screen) to reduce contrast and quality of a projected image.

To address this, in this Embodiment 3, as shown in FIG. 7, each of the polarization beam splitters 11a, 11b, 11c is provided with the first cooling unit C1 which is disposed in opposition to or in contact with a surface thereof, the first temperature sensor S1 for detecting the temperature of a portion of the polarization beam splitter cooled by the first cooling unit C1, the second cooling unit C2 disposed in opposition to or in contact with a surface of the polarization beam splitter opposite to the surface of the beam splitter above which the first cooling unit C1 is disposed in opposition in contact, the second temperature sensor S2 for detecting the temperature of a portion of the polarization beam splitter cooled by the second cooling unit C2, and a temperature control circuit D which operates the first cooling unit C1 in a constant state and controls the second cooling unit C2 based on the detection results of the first and second temperature sensors S1, S2.

Embodiment 3 is configured to control the second cooling unit C2 by the temperature control circuit D such that the cooling temperature detected by the first cooling unit C1 is substantially equal to the cooling temperature detected by the second cooling unit C2. Thus, substantially uniform temperature distribution can be achieved in each of the polarization beam splitters 11a, 11b, 11c to produce a projected image of high contrast and high quality.

Next, description is made for the reason why the first and second cooling units C1, C2 are provided and their specific configurations with reference to FIG. 8.

FIG. 8 shows only the polarization beam splitter 11a. Since the polarization beam splitters 11b, 11c have the same configurations, description thereof is omitted.

As shown in FIG. 8, the whole polarization beam splitter 11a is formed in a rectangular parallelepiped or cube shape. Reference numeral 41 shows a cooling fan (first cooling unit C1) which can cool the polarization beam splitter 11a. The cooling fan 41 is disposed in opposition to the surface of the polarization beam splitter 11a (top surface thereof in FIG. 8) through which the illumination light from the light source 1 does not pass (meaning incidence or exit).

Reference numeral 42 shows a Peltier element in a sheet form (second cooling unit C2) having one side serving as a heat absorbing surface (or radiating surface) and the other side serving as a heat generating surface as an electric current passes therethrough. The heat absorbing surface is in contact with the peripheral portion of the surface of the polarization beam splitter 11a (bottom surface thereof in FIG. 8) opposite to the surface above which the cooling fan 41 is disposed in opposition.

Reference numeral 43 shows the first temperature sensor (S1) which is fixed in contact with the substantially central portion of the surface of the polarization beam splitter 11a above which the cooling fan 41 is disposed in opposition. The temperature sensor 43 detects the temperature of the polarization beam splitter 11a to output an electrical signal (temperature information) to the temperature control circuit D. Reference numeral 44 shows the second temperature sensor (S2) which is fixed in contact with the substantially central portion of the surface of the polarization beam splitter 11a on which the Peltier element 42 is provided. The temperature sensor 44 detects the temperature of the polarization beam splitter 11a to output an electrical signal (temperature information) to the temperature control circuit D.

In this configuration, the two cooling units, or the cooling fan 41 and the Peltier element 42, are provided for the following reason. Similar to Embodiment 1, while the polarization beam splitter 11a can be cooled only by the cooling fan 41, most of the cooling wind is received by a portion of the polarization beam splitter 11a around the surface above which the cooling fan 41 is disposed in opposition and thus that portion is best cooled. The polarization beam splitter 11a, however, has a rectangular parallelepiped or cube shape and a large volume, so that the whole polarization beam splitter 11a cannot be cooled sufficiently only by the cooling fan 41, in particular, a temperature difference tends to occur between that portion and the surface opposite to the surface above which the cooling fan 41 is disposed.

Thus, in this Embodiment 3, the Peltier element 42 is provided on the surface (bottom surface in FIG. 8) of the polarization beam splitter 11a opposite to the surface above which the cooling fan 41 is disposed to sufficiently cool a portion around the surface (bottom surface in FIG. 8).

Figure 9:
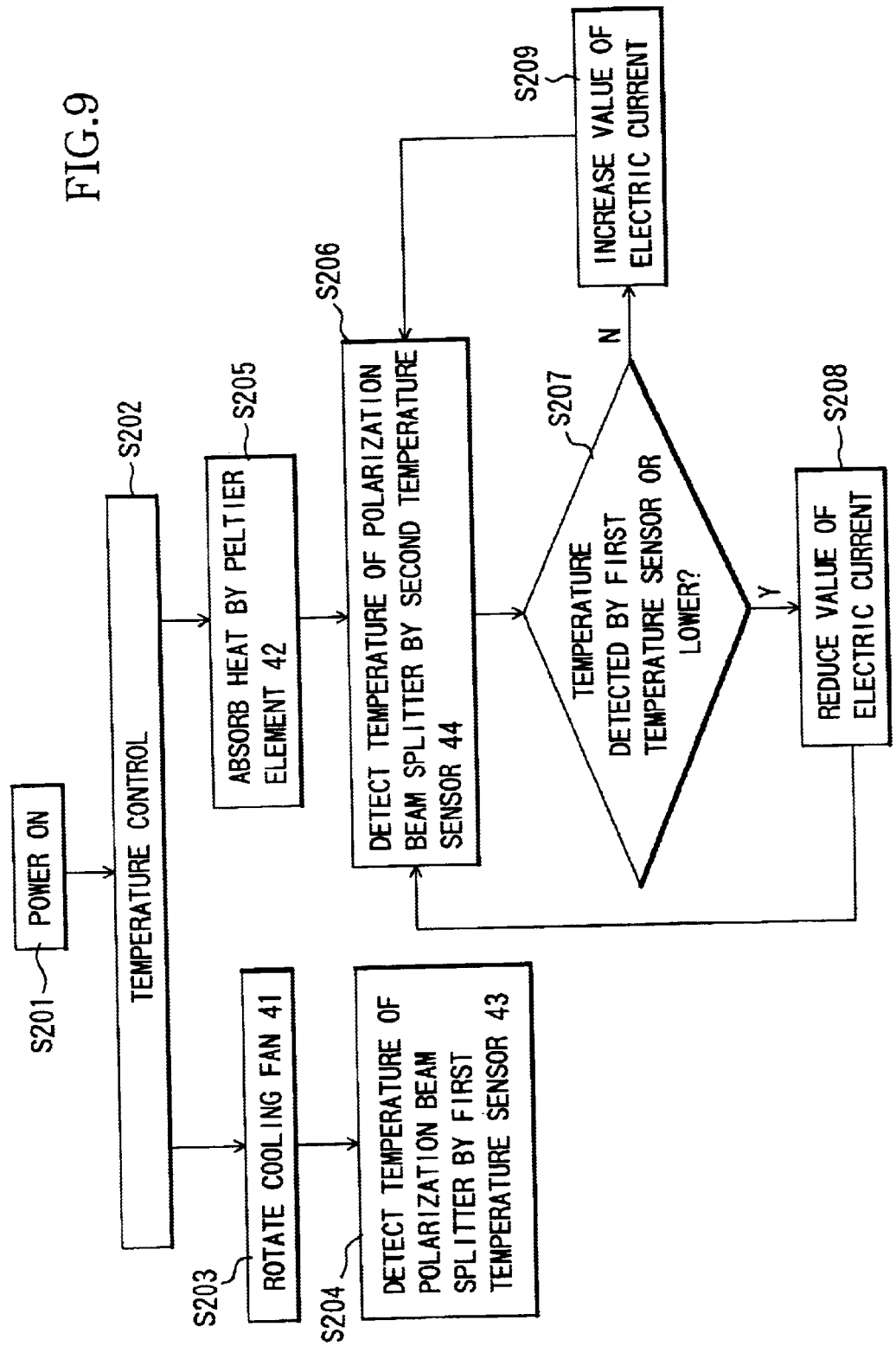
FIG. 9 is a flow chart for temperature control of the polarization beam splitter in Embodiment 3.

Next, the control of the Peltier element 42 by the temperature control circuit D is described with reference to a flow chart of FIG. 9 and FIGS. 7 and 8. Since the cooling control of the polarization beam splitters 11b, 11c is identical to that of the polarization beam splitter 11a, description is herein made only for the polarization beam splitter 11a.

Upon turn-on of the power of the image display apparatus (S201), the light source 1 is lit by a main control circuit consisting of a CPU or the like, not shown, responsible for control of the whole display apparatus. Next, the temperature control circuit D starts temperature control (S202), rotates the cooling fan 41 at a predetermined rotation number (S203), and the first temperature sensor 43 detects the temperature of a portion of the polarization beam splitter 11a closer to the cooling fan 41 (S204).

On the other hand, the temperature control circuit D passes an electric current through the Peltier element 42 to produce a heat absorbing effect (S205), thereby cooling the polarization beam splitter 11a. In this event, the second temperature sensor 44 detects the temperature of a portion of the polarization beam splitter 11a closer to the Peltier element 42 (S206).

The polarization beam splitter 11a is gradually heated by the illumination light from the light source 1. When the temperature detected by the second temperature sensor 44 is equal to or lower than the temperature detected by the first temperature sensor 43 (S207), the temperature control circuit D reduces the value of the electric current passing through the Peltier element 42 to perform control for increasing the temperature of the portion of the polarization beam splitter 11a closer to the Peltier element 42 (S208). Then, the second temperature sensor 44 again detects the temperature of the polarization beam splitter 11a (S206).

When the temperature detected by the second temperature sensor 44 is above the temperature detected by the first temperature sensor 43 (S207), the temperature control circuit D increases the value of the electric current passing through the Peltier element 42 to perform control for reducing the temperature of the portion of the polarization beam slitter 11a closer to the Peltier element 42 (S209). Then, the second temperature sensor 44 again detects the temperature of the polarization beam splitter 11a (S206).

With the repetition of such control, the temperature in the whole polarization beam splitter 11a is substantially equalized to the temperature detected by the first temperature sensor 43 to prevent the occurrence of internal stress in the polarization beam splitter 11a and the resulting birefringence.

Substantially uniform distribution of the temperature in each of the three polarization beam splitters 11a, 11b, 11c in this manner can prevent the occurrence of light leakage through each polarized light separating surface to produce a projected image of high contrast and high quality.

In Embodiment 3, since the cooling fan 41 is not controlled in terms of rotation number but caused to supply a constant quantity of wind, the cooling fan 41 need not be dedicated to cooling of the polarization beam splitter, and for example, a cooling wind from a fan for cooling the reflection type liquid crystal display element may be used. In this case, it is not necessary to provide a cooling fan dedicated to the cooling of the polarization beam splitter and thus space and cost advantages are offered.

While this Embodiment 3 has been described for the use of the cooling fan as the first cooling unit, the radiating member used in Embodiments 1 and 2 may be used, or a Peltier element through which a constant electric current passes may be used. This is effective in providing a quiet image display apparatus since noise as would be made in the cooling fan is not created by the Peltier element or the radiating member. In addition, the sheet form of the Peltier element can reduce the optical system and the apparatus in size as compared with using the cooling fan.

Figure 10:
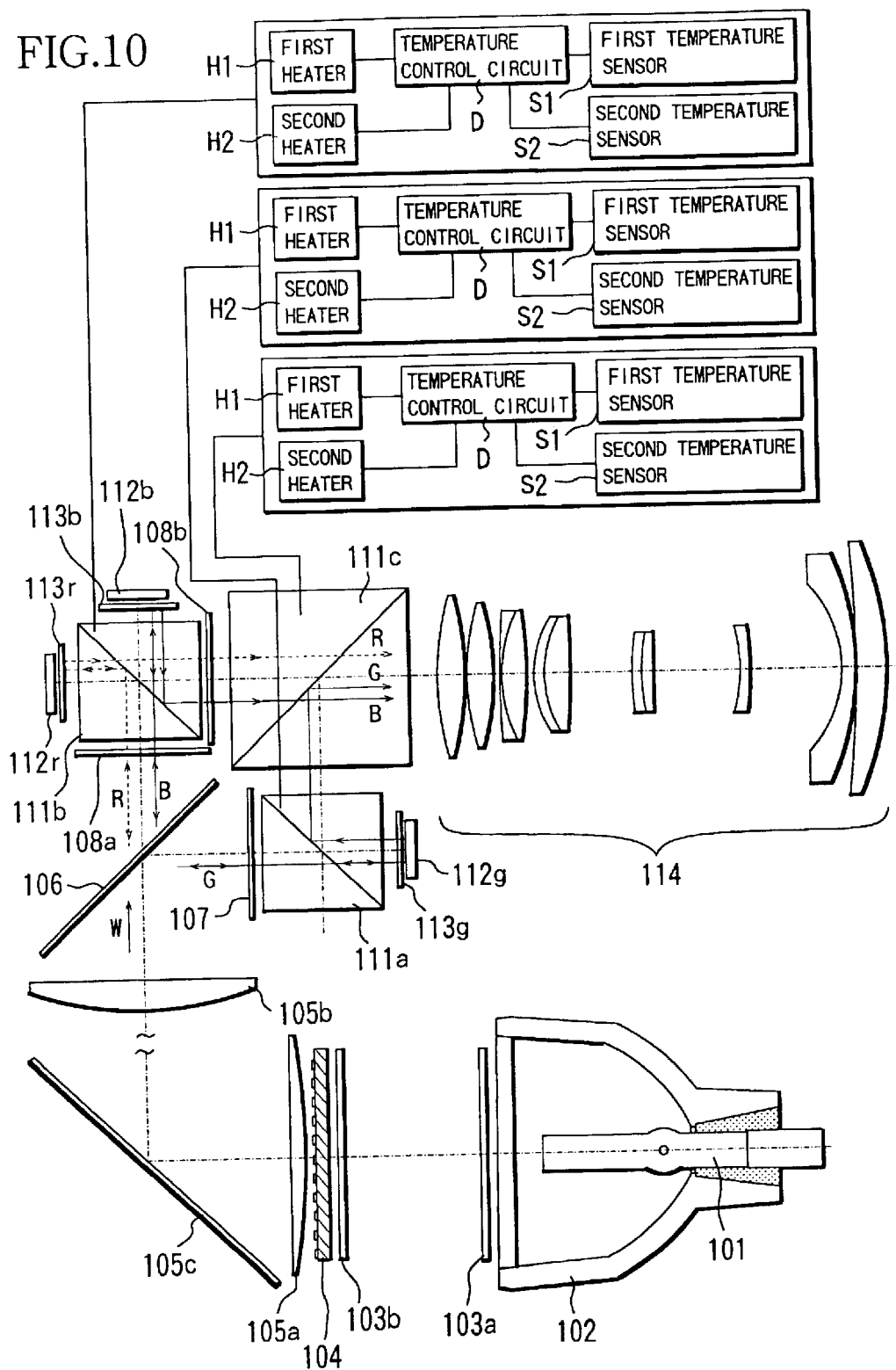
FIG. 10 shows the configuration of a projection type image display apparatus which is Embodiment 4 of the present invention.

FIG. 10 shows the configuration of a projection type image display apparatus which is Embodiment 4 of the present invention.

In FIG. 10, reference numeral 101 shows a light source which emits white light in a continuous spectrum, and reference numeral 102 shows a reflector which collects the light from the light source 101 in a predetermined direction. Reference numeral 103a shows the first fly eye lens which has rectangular lenses arranged in a matrix form, and reference numeral 103b shows the second fly eye lens which is formed of an array of lenses corresponding to the individual lenses of the first fly eye lens 103a. Reference numeral 104 shows a polarization converting element which converts non-polarized light into polarized light in a predetermined direction, 105a a condenser lens, 105b a field lens, and 105c a mirror.

Reference numeral 106 shows a dichroic mirror which transmits light components in wavelength areas of blue (B) and red (R) and reflects the light component in a wavelength area of green (G). Reference numeral 107 shows a color filter which partially cuts the light component in the wavelength area between those for green and red. Reference numeral 108a is the first color selecting phase plate which converts the polarization direction of the light component for red by 90 degrees and does not convert the polarization direction of the light component for blue. Reference numeral 108b shows the second color selecting phase plate which converts the polarization direction of the light component for blue by 90 degrees and does not convert the polarization direction of the light component for red.

Reference numerals 111a, 111b, 111c show the first, second and third polarization beam splitters, each of which has a polarized light separating surface for transmitting P-polarized light and reflecting S-polarized light. Each of these polarization beam splitters 111a, 111b, 111c is formed by bonding a pair of optical glass pieces in a triangular prism shape such that the polarized light separating surface made of a multilayer film is formed on the bonding surface.

Reference numerals 112r, 112g, 112b show a reflection type liquid crystal display element for red, a reflection type liquid crystal display element for green, and a reflection type liquid crystal display element for blue, respectively, each of which reflects and modulates incident light and emits the modulated image light (display an image). These reflection type liquid crystal display elements 112r, 112g, 112b are connected to a drive circuit, not shown. The driver circuit is supplied with image information from an image information supply apparatus such as a personal computer, a television, a VCR, or a DVD player, not shown. The drive circuit drives the reflection type liquid crystal display elements based on the image information to display an image for each color. In this manner, an image display system is implemented.

Reference numerals 113g, 113r, 113b show the first quarter-wave plate for green, the second quarter-wave plate for red, and the third quarter-wave plate for blue, respectively. Reference numeral 114 shows projection lenses.

The whole optical system from the light source 101 to the projection lenses 114 serves as an image display optical system, and of these components, the dichroic mirror 106 to the third polarization beam splitter 111c serve as a color separation/combination optical system.

Illumination light (white light) emanating from the light source 101 passes through the first fly eye lens 103a and the second fly eye lens 103b and is incident on the polarization converting element 104 which converts the light into P-polarized light. The illumination light having been converted into the P-polarized light passes through the condenser lens 105a, is reflected by the mirror 105c, passes through the field lens 105b, and is incident on the dichroic mirror 106. The illumination light incident on the dichroic mirror 106 is separated into the light component for green and the light component for red and blue through reflection of the light component for green and transmission of the light components for red and blue.

The P-polarized light component for green reflected by the dichroic mirror 106 is incident on the first polarization beam splitter 111a through the color filter 107. The P-polarized light component for green passes through the polarized light separating surface of the first polarization beam splitter 111a and is incident on the reflection type liquid crystal display element 112g for green through the first quarter-wave plate 113g for green.

In this event, a small amount of S-polarized light mixed into the illumination light due to a limited value of the conversion efficiency of the polarization converting element 104 is reflected by the polarized light separating surface of the first polarization beam splitter 111a and removed from a main optical path.

When the P-polarized light component for green is incident on the reflection type liquid crystal display element 112g for green, the reflection type liquid crystal display element 112g has no effect on the incident light for black display. The incident light component for green is again incident on the first polarization beam splitter 111a through the first quarter-wave plate 113g, passes through the polarized light separating surface of the first polarization beam splitter 111a, and returns toward the light source 101.

For white display, the reflection type liquid crystal display element 112g for green rotates the polarization direction of the incident light by 90 degrees and thus the resulting S-polarized light emanates therefrom. The emanating light is again incident on the first polarization beam splitter 111a through the first quarter-wave plate 113g.

The light component for green changed into the S-polarized light is reflected by the polarized light separating surface of the first polarization beam splitter 111a, is incident on the third polarization beam splitter 111c, and reflected by the polarized light separating surface of the third polarization beam splitter 111c, and forms an image on a screen (projection surface), not shown, through the projection lenses 114.

On the other hand, the light components for red and blue passing through the dichroic mirror 106 is incident on the first color selecting phase plate 108a which converts the P-polarized light component for red into S-polarized light. The S-polarized light component for red and the P-polarized light component for blue are incident on the second polarization beam splitter 111b.

The light component for red incident on the second polarization beam splitter 111b as the S-polarized light is reflected by the polarized light separating surface of the second polarization beam splitter 111b and incident on the reflection type liquid crystal display element 112r for red through the second quarter-wave plate 113r.

When the S-polarized light component for red is incident on the reflection type liquid crystal display element 112r for red, the reflection type liquid crystal display element 112r for red has no effect on the incident light for black display. The incident S-polarized light component for red is again incident on the second polarization beam splitter 111b through the second quarter-wave plate 113r, reflected by the polarized light separating surface of the second polarization beam splitter 111b, and returns toward the light source 101.

For white display, the reflection type liquid crystal display element 112r for red rotates the polarization direction of the incident light by 90 degrees and thus the resulting P-polarized light emanates therefrom. The emanating light is again incident on the second polarization beam splitter 111b through the second quarter-wave plate 113r, passes through the polarized light separating surface of the second polarization beam splitter 111b, and is incident on the second color selecting phase plate 108b.

The second color selecting phase plate 108b has a function of converting the polarization direction of the light component for blue and has no effect on the light component for red.

Then, the P-polarized light component for red is incident on the third polarization beam splitter 111c and passes through the polarized light separating surface of the third polarization beam splitter 111c and forms an image on the screen, not shown, through the projection lenses 114.

The light component for blue incident on the second polarization beam splitter 111b as the P-polarized light passes through the polarized light separating surface of the second polarization beam splitter 111b and is incident on the reflection type liquid crystal display element 112b for blue through the third quarter-wave plate 113b.

When the P-polarized light component for blue is incident on the reflection type liquid crystal display element 112b for blue, the reflection type liquid crystal display element 112b for blue has no effect on the incident light for black display. The incident P-polarized light component for blue is again incident on the second polarization beam splitter 111b through the third quarter-wave plate 113b, passes through the polarized light separating surface of the second polarization beam splitter 111b, and returns toward the light source 101.

For white display, the reflection type liquid crystal display element 112b for blue rotates the polarization direction of the incident light by 90 degrees and thus the resulting S-polarized light emanates therefrom. The emanating light is again incident on the second polarization beam splitter 111b through the third quarter-wave plate 113b, is reflected by the polarized light separating surface of the second polarization beam splitter 111b, and is incident on the second color selecting phase plate 108b.

Since the second color selecting phase plate 108b has the function of converting the polarization direction of the light component for blue, the S-polarized light component for blue is converted to P-polarized light which is incident on the third polarization beam splitter 111c.

Then, the light component for blue incident on the third polarization beam splitter 111c passes through the polarized light separating surface of the third polarization beam splitter 111c and then forms an image on the screen, not shown, through the projection lenses 114.

In the projection type image display apparatus configured as above, the illumination light from the light source 101 generally heats the components which transmit or reflect the light. Thus, the polarization beam splitters 111a, 111b, 111c also are heated.

As for the distribution of temperature in each of the polarization beam splitters 111a, 111b, 111c, the whole polarization beam splitter is not at a uniform temperature but shows temperature distribution involving a temperature difference due to distribution of the illumination light (central light and peripheral light), the shape and volume of the polarization beam splitter, and the like.

Such a temperature difference in the polarization beam splitter produces internal stress in the optical glass material constituting the polarization beam splitter to cause birefringence which converts linearly polarized light incident thereon into elliptically polarized light under the influence of photoelasticity. Thus, an undesired polarized light component is incident on the polarized light separating surface which then cannot provide reflection or transmission with reliability (meaning that the relationship between the reflection and transmission is not established). This causes light leakage through the polarized light separating surface to reach a projection surface (screen) to reduce contrast and quality of a projected image.

Thus, in this Embodiment 4, as shown in FIG. 10, each of the polarization beam splitters 111a, 111b, 111c is provided with heaters H1, H2, temperature sensors S1, S2 for detecting the temperature of portions of the polarization beam splitter heated by the heaters H1, H2, and a temperature control circuit D for controlling the heaters H1, H2 based on the detection results of the first and second temperature sensors S1, S2 to manage the temperature of the polarization beam splitters 111a, 111b, 111c.

In Embodiment 4, the temperature control circuit D controls temperature under the setting as below:

$$T1 \leq T2$$

where T1 represents the temperature of the polarization beam splitters 111a, 111b, 111c heated by the illumination light from the light source 101 and T2 represents the heating temperature of the heaters H1, H2.

Specifically, an advantage is taken of the constant heating of the polarization beam splitters 111a, 111b, 111c by the illumination light from the light source 101 to control the amount of heat generation of the heaters H1, H2 such that the heating temperature T2 of the heaters H1, H2 is equal to or higher than the temperature T1 of the polarization beam splitters 111a, 111b, 111c heated by the illumination light. Thus, only auxiliary heating of the polarization beam splitters 111a, 111b, 111c by the heaters H1, H2 can almost eliminate a temperature difference in the whole polarization beam splitters 111a, 111b, 111c to produce a power saving effect.

When the temperature T1 is set near a controlled temperature of the liquid crystal display elements 112r, 112g, 112b, the liquid crystal display elements 112r, 112g, 112b and the polarization beam splitters 111a, 111b, 111c can be at a substantially equal temperature since the elements 112r, 112g, 112b are disposed near the beam splitters 111a, 111b, 111c. Consequently, the temperature of the one is not affected by that of the other to allow ready temperature control.

With such control and settings, substantially uniform temperature distribution can be achieved in each of the polarization beam splitters 111a, 111b, 111c to produce a projected image of high contrast and high quality.

Figure 11:
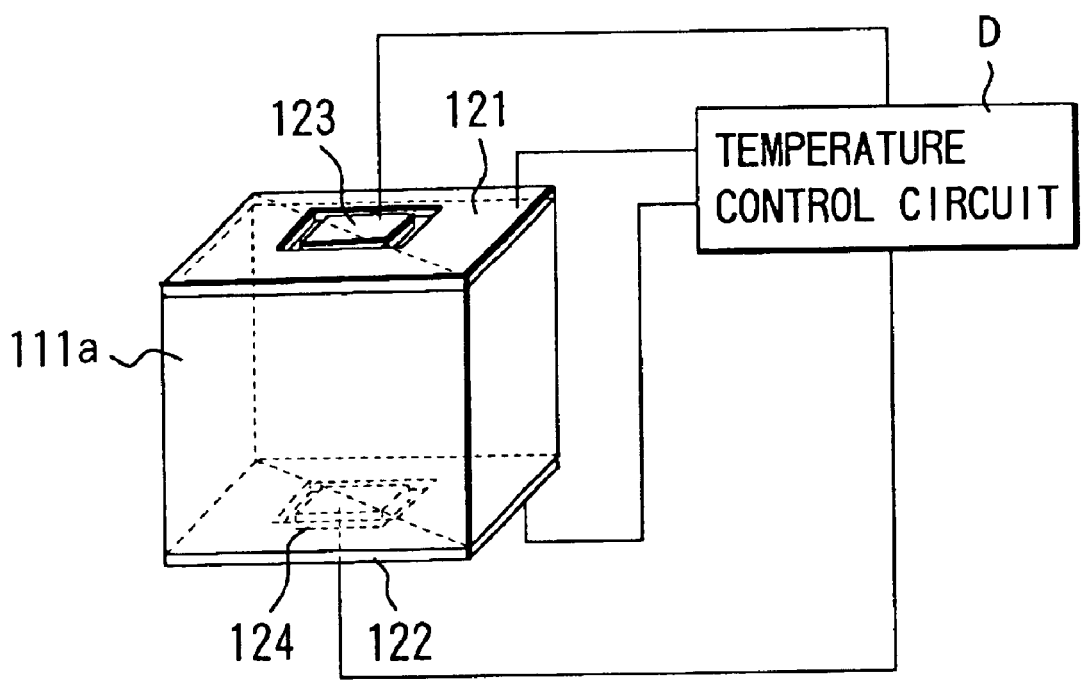
FIG. 11 shows the structure of a polarization beam splitter and its surroundings in Embodiment 4.

Next, description is made for the reason why the two heaters H1, H2 are provided and their specific configurations with reference to FIG. 11.

FIG. 11 shows only the polarization beam splitter 111a. Since the polarization beam splitters 111b, 111c have the same configurations, description thereof is omitted.

As shown in FIG. 11, the whole polarization beam splitter 111a is formed in a rectangular parallelepiped or cube shape.

Reference numeral 121 shows the first heater (H1) which is formed of a heat generating element such as a semiconductor and fixed in contact with the peripheral portion of a surface of the polarization beam splitter 111a (top surface thereof in FIG. 11) through which the illumination light from the light source 101 does not transmit (meaning incidence or exit). Reference numeral 122 shows the second heater (H2) which is formed of a heat generating element such as a semiconductor similarly to the first heater 121 and fixed in contact with the peripheral portion of a surface of the polarization beam splitter 111a (bottom surface thereof in FIG. 11) opposite to the surface on which the first heater 121 is provided.

Reference numeral 123 shows the first temperature sensor (S1) fixed in contact with the substantially central portion of the surface of the polarization beam splitter 111a on which the first heater 121 is provided. The first temperature sensor 123 detects the temperature of the polarization beam splitter 111a to output an electrical signal (temperature information) to the temperature control circuit D. Reference numeral 124 shows the second temperature sensor (S2) fixed in contact with the substantially central portion of the surface of the polarization beam splitter 111a on which the second heater 122 is provided. The second temperature sensor 124 detects the temperature of the polarization beam splitter 111a to output an electrical signal (temperature information) to the temperature control circuit D.

Figure 12:
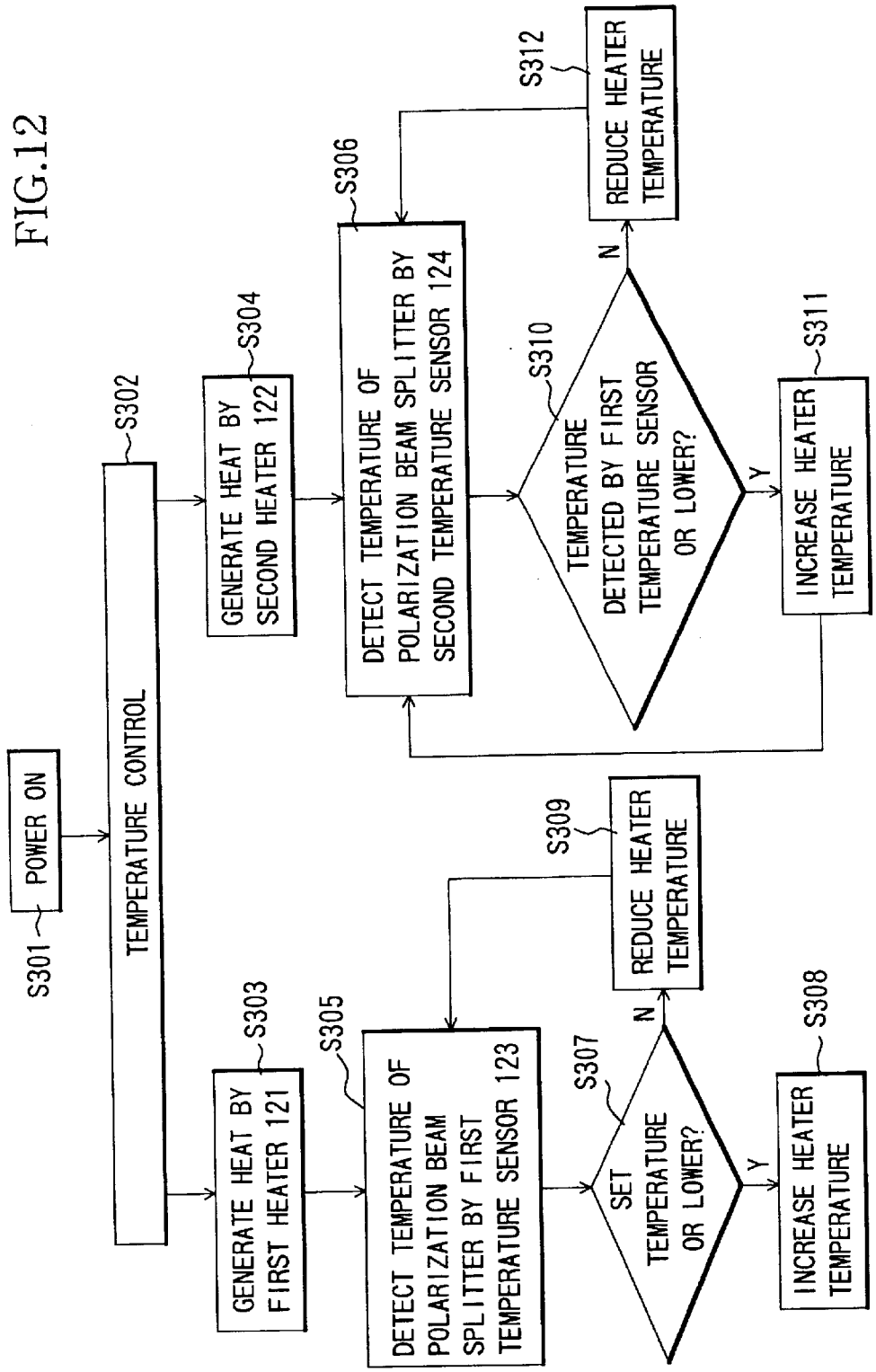
FIG. 12 is a flow chart for temperature control of the polarization beam splitter in Embodiment 4.

Next, the heating control of the polarization beam splitter through the first and second heaters 121, 122 by the temperature control circuit D is described with reference to a flow chart of FIG. 12, and FIGS. 10 and 11. Since the heating control of the polarization beam splitters 111b, 111c is identical to that of the polarization beam splitter 111a, description is herein made only for the polarization beam splitter 111a.

Upon turn-on of the power of the image display apparatus (S301), the light source 101 is lit by a main control circuit formed of a CPU or the like, not shown, responsible for control of the whole display apparatus. Next, the temperature control circuit D starts temperature control (S302), and passes an electric current through the first heater 121 and the second heater 122 to cause them to generate heat (S303, S304).

In this event, the first temperature sensor 123 and the second temperature sensor 124 detect the temperature of the polarization beam splitter 111a (S305, S306).

The polarization beam splitter 111a is gradually heated by the illumination light from the light source 101 and the heat generated by the first and second heaters 121, 122. When the temperature detected by the first temperature sensor 123 is equal to or lower than a set temperature value, later described (S307), the temperature control circuit D controls the amount of the electric current to increase the heating temperature of the first heater 121 (S308). Then, the first temperature sensor 123 again detects the temperature of the polarization beam splitter 111a (S305).

The aforementioned "set temperature value" refers to the temperature T1 which is the highest temperature of the polarization beam splitter 111a after the illumination light from the light source 101 has been incident on the polarization beam splitter 111a for a long time.

When the temperature detected by the first temperature sensor 123 is a temperature above the set temperature value (S307), the temperature control circuit D controls the amount of the electric current to reduce the heating temperature of the first heater 121 (S309). Then, the first temperature sensor 123 again detects the temperature of the polarization beam splitter 111a (S305).

On the other hand, when the temperature detected by the second temperature sensor 124 is equal to or lower than the temperature detected by the first temperature sensor 123 (S310), the temperature control circuit D controls the electric current to increase the heating temperature of the second heater 122 (S311). Then, the second temperature sensor 124 again detects the temperature of the polarization beam splitter 111a (S306).

When the temperature detected by the second temperature sensor 124 is above the temperature detected by the first temperature sensor 123 (S310), the temperature control circuit D controls the electric current to reduce the heating temperature of the second heater 122 (S312). Then, the second temperature sensor 124 again detects the temperature of the polarization beam splitter 111a (S306).

With the repetition of such control, the temperature in the whole polarization beam splitter 111a is substantially equalized to the temperature detected by the first temperature sensor 123 (that is, the set temperature T1) to prevent the occurrence of internal stress in the polarization beam splitter 111a and the resulting birefringence.

Substantially uniform distribution of the temperature in each of the three polarization beam splitters 111a, 111b, 111c in this manner can prevent the occurrence of light leakage through each polarized light separating surface to produce a projected image of high contrast and high quality.

Figure 13:
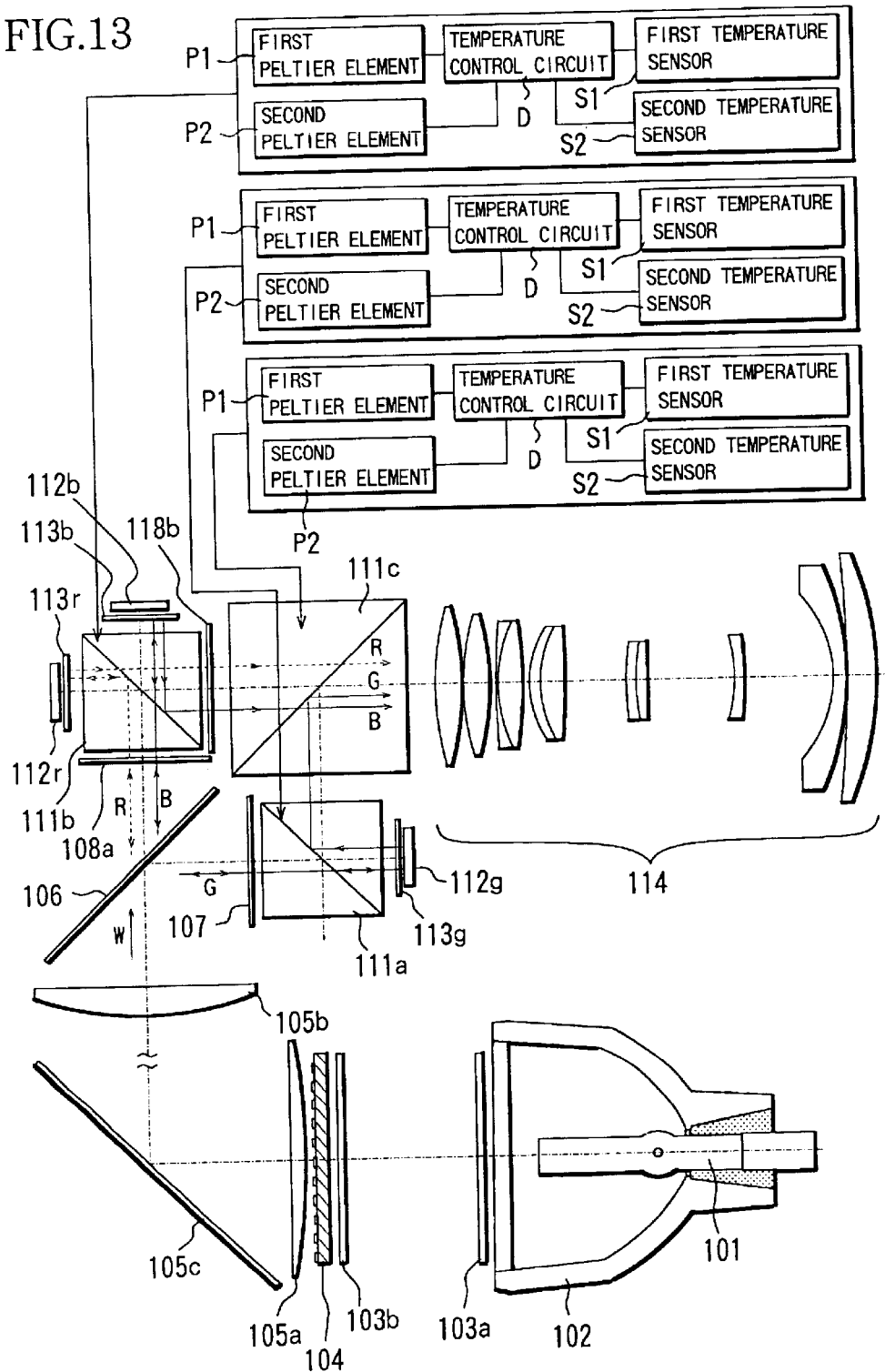
FIG. 13 shows the configuration of a projection type image display apparatus which is Embodiment 5 of the present invention.
Figure 14:
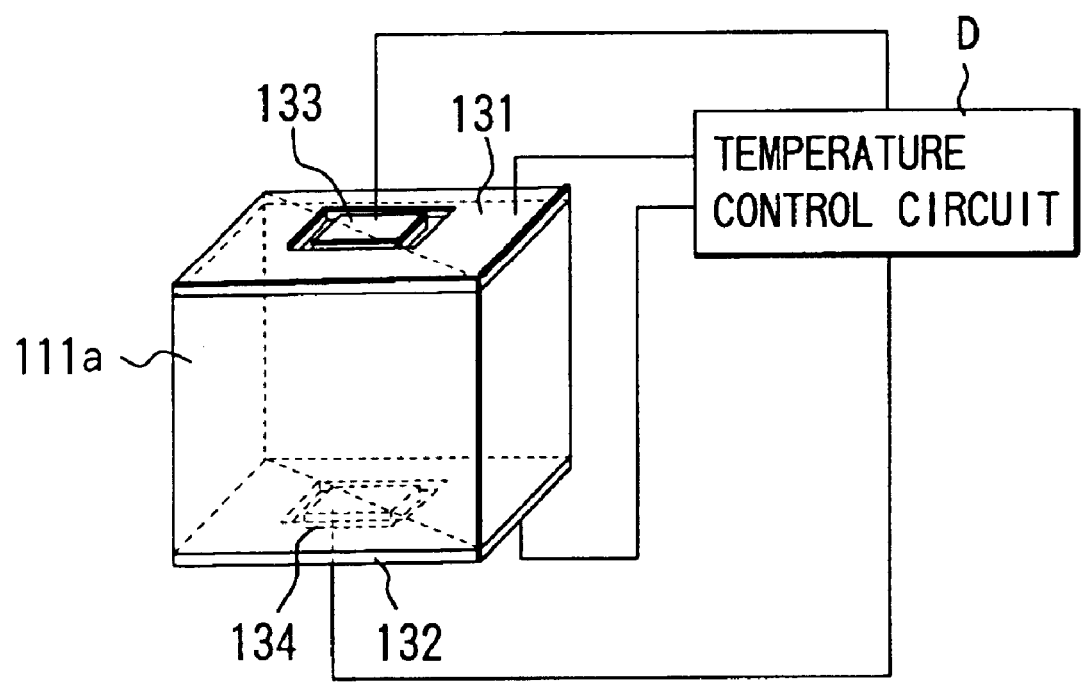
FIG. 14 shows the structure of a polarization beam splitter and its surroundings in Embodiment 5.

FIGS. 13 and 14 show the configuration of a projection type image display apparatus which is Embodiment 5 of the present invention. It should be noted that components common to both this Embodiment 5 and Embodiment 4 are designated with the same reference numerals as those in Embodiment 4 to omit description thereof.

In this Embodiment 5, illumination light from a light source 101 heats polarization beam splitters 111a, 111b, 111c.

As for the distribution of temperature in each of the polarization beam splitters 111a, 111b, 111c, the whole polarization beam splitter is not at a uniform temperature but shows temperature distribution involving a temperature difference due to distribution of the illumination light (central light and peripheral light), the shape and volume of the polarization beam splitter, and the like.

Such a temperature difference in the polarization beam splitter produces internal stress in the optical glass material constituting the polarization beam splitter to cause birefringence which converts linearly polarized light incident thereon into elliptically polarized light under the influence of photoelasticity. Thus, an undesired polarized light component is incident on a polarized light separating surface which then cannot provide reflection or transmission with reliability (meaning that the relationship between the reflection and transmission is not established). This causes light leakage through the polarized light separating surface to reach a projected surface (on a screen) to reduce contrast and quality of a projected image.

Thus, this Embodiment 5, as shown in FIG. 13, each of the polarization beam splitters 111a, 111b, 111c is provided with Peltier elements in a sheet form P1, P2, each of which has one surface serving as a heat generating surface and the other surface serving as a heat absorbing surface (or a radiating surface) as an electric current passes therethrough, temperature sensors S1, S2 for detecting the temperature of portions of the polarization beam splitter heated by the Peltier elements P1, P2, and a temperature control circuit D for controlling the Peltier elements P1, P2 based on the detection results of the temperature sensors S1, S2 to manage the temperature of the polarization beam splitters 111a, 111b, 111c.

In Embodiment 5, the temperature control circuit D controls temperature under the setting as below:

$$T1 \leq T2$$

where T1 represents the temperature of the polarization beam splitters 111a, 111b, 111c heated by the illumination light from the light source 101 and T2 represents the heating temperature of the Peltier elements P1, P2.

Specifically, an advantage is taken of the constant heating of the polarization beam splitters 111a, 111b, 111c by the illumination light from the light source 101 to control the amount of heat generation of the Peltier elements P1, P2 such that the heating temperature T2 of the Peltier elements P1, P2 is equal to or higher than the temperature T1 of the polarization beam splitters 111a, 111b, 111c heated by the illumination light. Thus, only auxiliary heating of the polarization beam splitters 111a, 111b, 111c by the Peltier elements P1, P2 can almost eliminate a temperature difference in the polarization beam splitters 111a, 111b, 111c to produce a power saving effect.

When the temperature T1 is set near a controlled temperature for the liquid crystal display elements 112r, 112g, 112b, the liquid crystal display elements 112r, 112g, 112b and the polarization beam splitters 111a, 111b, 111c can be at a substantially equal temperature since the elements 112r, 112g, 112b are disposed near the beam splitters 111a, 111b, 111c. Consequently, the temperature of the one is not affected by that of the other to allow ready temperature control.

With such control and settings, substantially uniform temperature distribution can be achieved in each of the polarization beam splitters 111a, 111b, 111c to produce a projected image of high contrast and high quality.

Next, description is made for the reason why the two Peltier elements P1, P2 are provided and their specific configurations with reference to FIG. 14.

FIG. 14 shows only the polarization beam splitter 111a. Since the polarization beam splitters 111b, 111c have the same configurations, description thereof is omitted.

As shown in FIG. 14, the whole polarization beam splitter 111a is formed in a rectangular parallelepiped or cube shape.

Reference numeral 131 shows the first Peltier element (P1) which is fixed in contact with the peripheral portion of a surface of the polarization beam splitter 111a (top surface thereof in FIG. 14) through which the illumination light from the light source 101 does not transmit (meaning incidence or exit). Reference numeral 132 shows the second Peltier element (P) which is fixed in contact with the peripheral portion of a surface of the polarization beam splitter 111a (bottom surface thereof in FIG. 14) opposite to the surface on which the first Peltier element 131 is provided.

Reference numeral 133 shows the first temperature sensor (S1) fixed in contact with the substantially central portion of the surface of the polarization beam splitter 111a on which the Peltier element 131 is provided. The first temperature sensor 133 detects the temperature of the polarization beam splitter 111a to output an electrical signal (temperature information) to the temperature control circuit D. Reference numeral 134 shows the second temperature sensor (S2) fixed in contact with the substantially central portion of the surface of the polarization beam splitter 111a on which the second Peltier element 132 is provided. The second temperature sensor 134 detects the temperature of the polarization beam splitter 111a to output an electrical signal (temperature information) to the temperature control circuit D.

Figure 15:
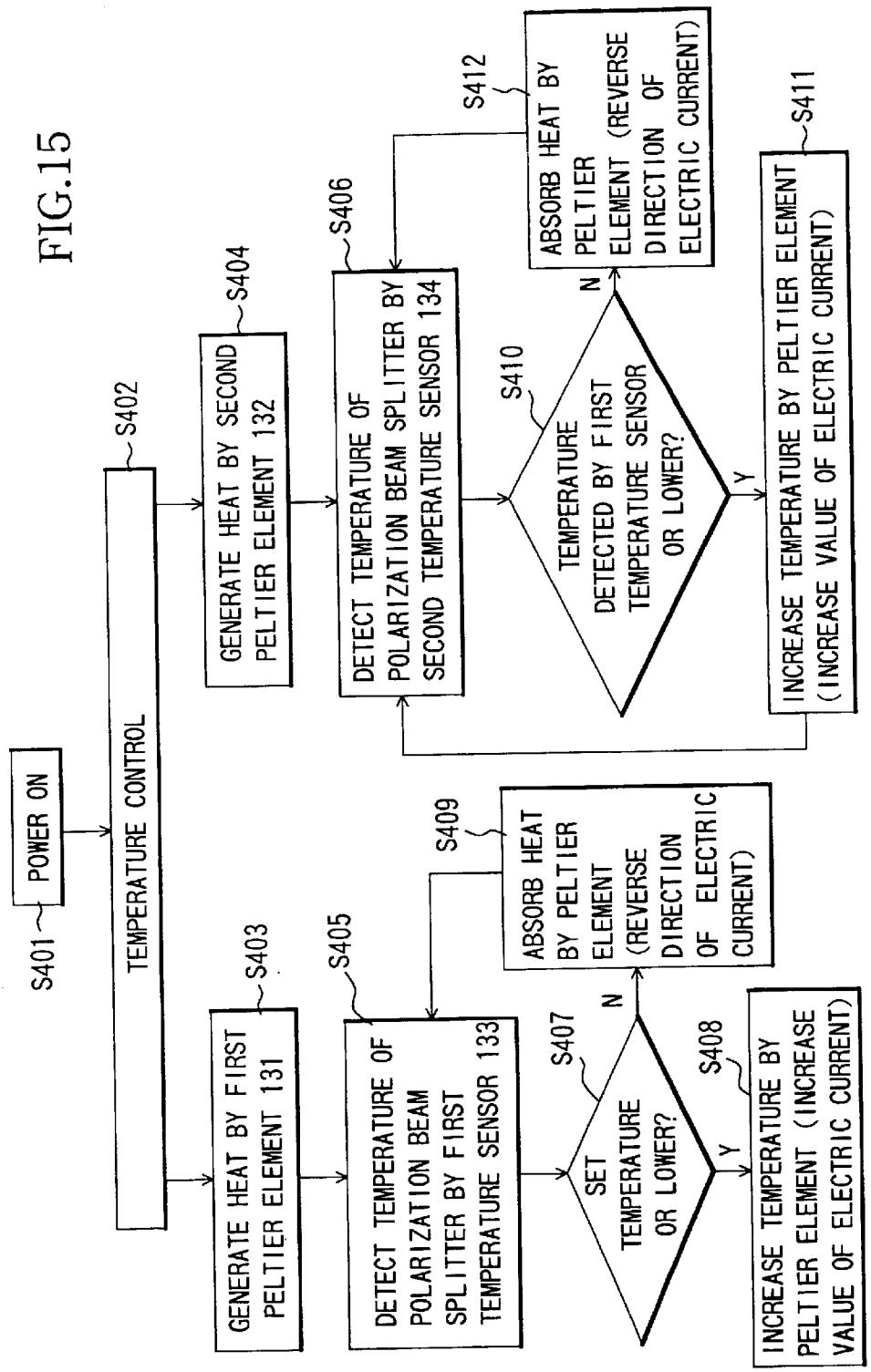
FIG. 15 is a flow chart for temperature control of the polarization beam splitter in Embodiment 5.

Next, the heating control of the polarization beam splitter through the first and second Peltier elements 131, 132 by the temperature control circuit D is described with reference to a flow chart of FIG. 15 and FIGS. 13 and 14. Since the heating control of the polarization beam splitters 111b, 111c is identical to that of the polarization beam splitter 111a, description is herein made only for the polarization beam splitter 111a.

Upon turn-on of the power of the image display apparatus (S401), the light source 101 is lit by a main control circuit consisting of a CPU or the like, not shown, responsible for control of the whole display apparatus. Next, the temperature control circuit D starts temperature control (S402), and passes an electric current through the first Peltier element 131 and the second Peltier element 132 to generate heat at their surfaces which are secured to the polarization beam splitter 111a (S403, S404). In this event, the first temperature sensor 133 and the second temperature sensor 134 detect the temperature of the polarization beam splitter 111a (S405, S406).

The polarization beam splitter 111a is gradually heated by the illumination light from the light source 101 and the heat generated by the first and second Peltier elements 131, 132. When the temperature detected by the first temperature sensor 133 is equal to or lower than a set temperature value, later described (S407), the temperature control circuit D increases the value of the passing electric current to increase the heating temperature of the first Peltier element 131 (S408). Then, the first temperature sensor 133 again detects the temperature of the polarization beam splitter 111a (S405).

The aforementioned "set temperature value" refers to the temperature T1 which is the highest temperature of the polarization beam splitter 111a after the illumination light from the light source 101 has been incident on the polarization beam splitter 111a for a long time.

When the temperature detected by the first temperature sensor 133 is a temperature above the set temperature value (S407), the temperature control circuit D reverses the direction of the passing electric current to produce a heat absorbing effect at the surface of the Peltier element 131 which is in contact with the polarization beam splitter 111a in a range of temperatures not below the set temperature value (S409). Then, the first temperature sensor 133 again detects the temperature of the polarization beam splitter 111a (S405).

On the other hand, when the temperature value detected by the second temperature sensor 134 is equal to or lower than the temperature value detected by the first temperature sensor 133 (S410), the temperature control circuit D increases the value of the passing electric current to increase the heating temperature of the second Peltier element 132 (S411). Then, the second temperature sensor 134 again detects the temperature of the polarization beam splitter 111a (S406).

When the temperature detected by the second temperature sensor 134 is above the temperature detected by the first temperature sensor 133 (S410), the temperature control circuit D reverses the direction of the passing electric current to produce a heat absorbing effect at the surface of the Peltier element 132 which is in contact with the polarization beam splitter 111a in a range of temperatures not below the set temperature value (S412). Then, the second temperature sensor 134 again detects the temperature of the polarization beam splitter 111a (S406).

With the repetition of such control, the temperature in the whole polarization beam splitter 111a is substantially equalized to the temperature detected by the first temperature sensor 133 (that is, the set temperature T1) to prevent the occurrence of internal stress in the polarization beam splitter 111a and the resulting birefringence.

Substantially uniform distribution of the temperature in each of the three polarization beam splitters 111a, 111b, 111c in this manner can prevent the occurrence of light leakage through each polarized light separating surface to produce a projected image of high contrast and high quality.

Figure 16:
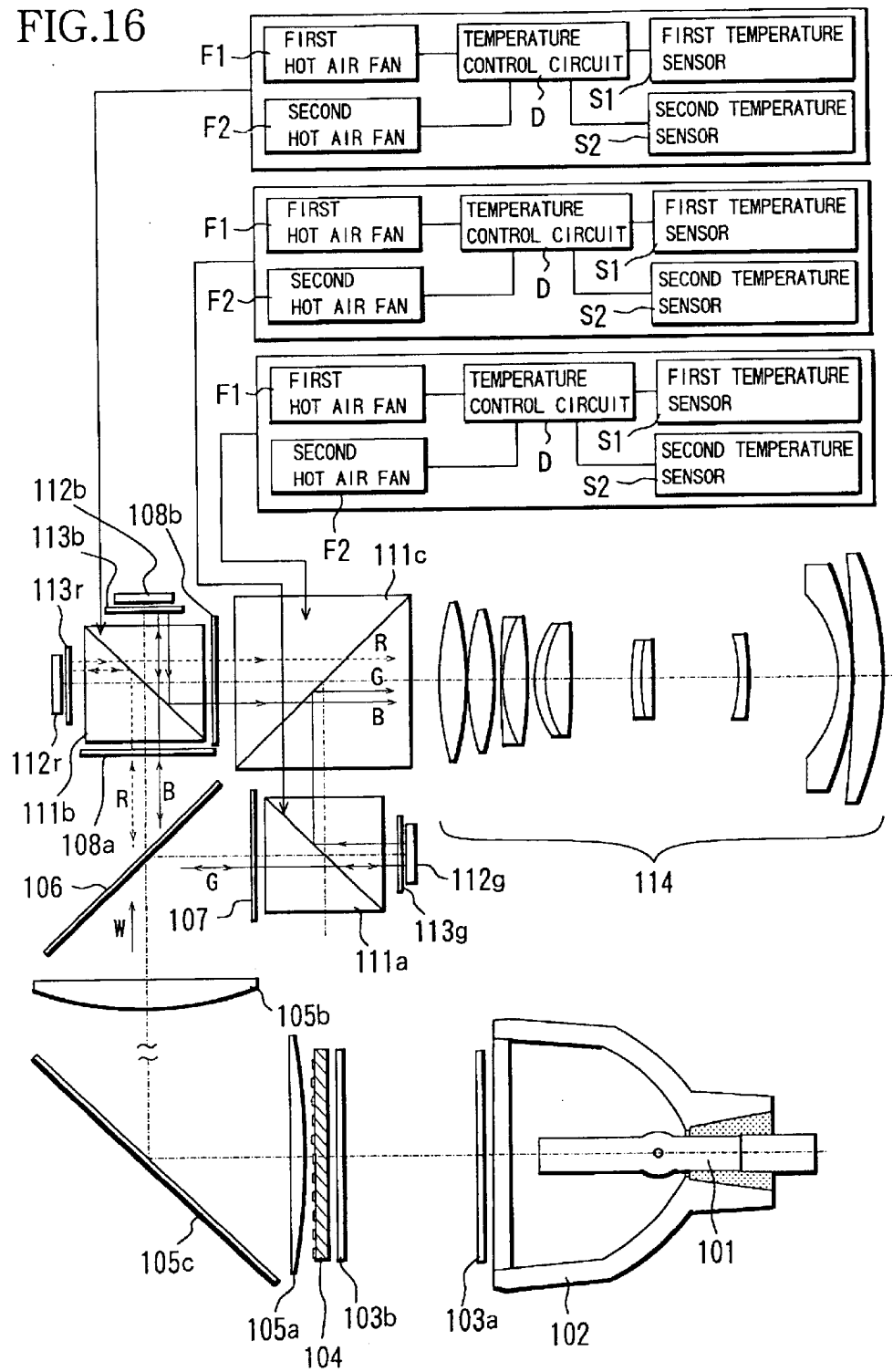
FIG. 16 shows the configuration of a projection type image display apparatus which is Embodiment 6 of the present invention.
Figure 17:
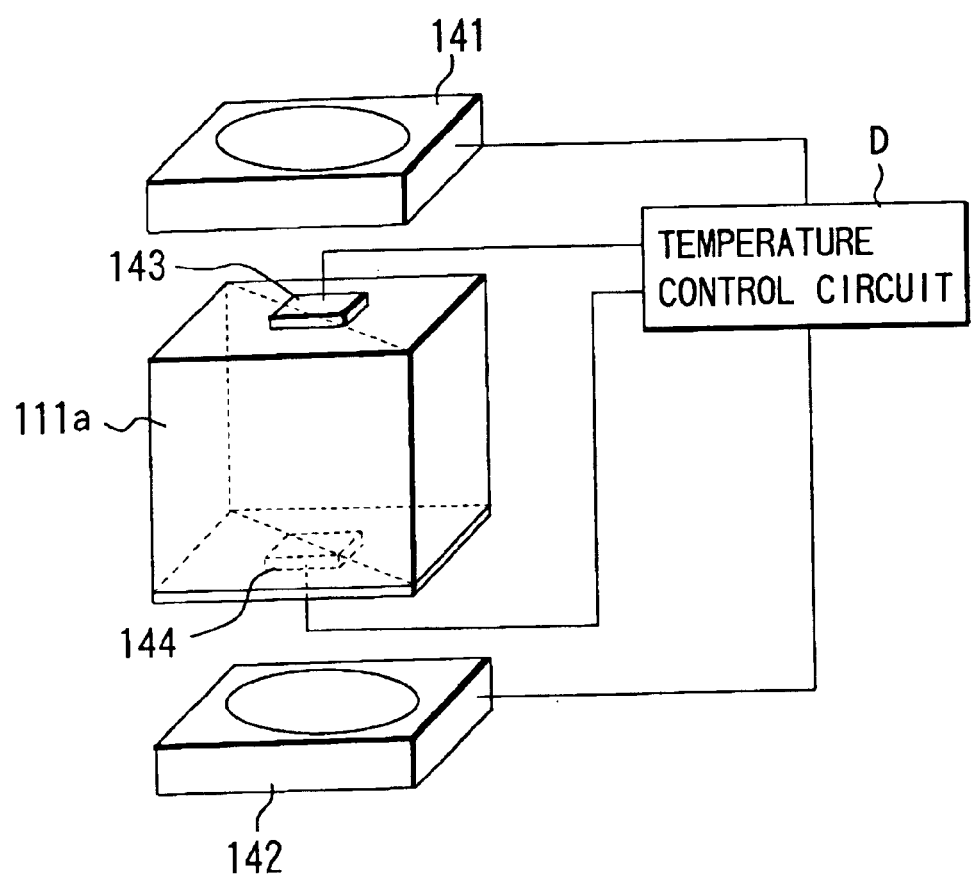
FIG. 17 shows the structure of a polarization beam splitter and its surroundings in Embodiment 6.

FIGS. 16 and 17 show the configuration of a projection type image display apparatus which is Embodiment 6 of the present invention. It should be noted that components common to both this Embodiment 6 and Embodiment 4 are designated with the same reference numerals as those in Embodiment 4 to omit description thereof.

In this Embodiment 6, illumination light from a light source 101 heats polarization beam splitters 111a, 111b, 111c.

As for the distribution of temperature in each of the polarization beam splitters 111a, 111b, 111c, the whole polarization beam splitter is not at a uniform temperature but shows temperature distribution involving a temperature difference due to distribution of the illumination light (central light and peripheral light), the shape and volume of the polarization beam splitter, and the like.

Such a temperature difference in the polarization beam splitter produces internal stress in the optical glass material constituting the polarization beam splitter to cause birefringence which converts linearly polarized light incident thereon into elliptically polarized light under the influence of photoelasticity. Thus, an undesired polarized light component is incident on a polarized light separating surface which then cannot provide reflection or transmission with reliability (meaning that the relationship between the reflection and transmission is not established). This causes light leakage through the polarized light separating surface to reach a projection surface (screen) to reduce contrast and quality of a projected image.

Thus, in this Embodiment 6, as shown in FIG. 16, each of the polarization beam splitters 111a, 111b, 111c is provided with hot-air fans F1, F2, temperature sensors S1, S2 for detecting the temperature of portions of the polarization beam splitter heated by the hot-air fans F1, F2, and a temperature control circuit D for controlling the hot-air fans F1, F2 based on the detection results of the temperature sensors S1, S2 to manage the temperature of the polarization beam splitters 111a, 111b, 111c.

In this Embodiment 6, the temperature control circuit D controls temperature under the setting as below:

$$T1 \leq T2$$

where T1 represents the temperature of the polarization beam splitters 111a, 111b, 111c heated by the illumination light from the light source 101 and T2 represents the heating temperature of the hot-air fans F1, F2.

Specifically, an advantage is taken of the constant heating of the polarization beam splitters 111a, 111b, 111c by the illumination light from the light source 101 to control the amount of heat generation of the hot-air fans F1, F2 such that the heating temperature T2 of the hot-air fans F1, F2 is equal to or higher than the temperature T1 of the polarization beam splitters 111a, 111b, 111c heated by the illumination light. Thus, only auxiliary heating of the polarization beam splitters 111a, 111b, 111c by the hot-air fans F1, F2 can almost eliminate a temperature difference in the polarization beam splitters 111a, 111b, 111c to produce a power saving effect.

When the temperature T1 is set near a controlled temperature for the liquid crystal display elements 112r, 112g, 112b, the liquid crystal display elements 112r, 112g, 112b and the polarization beam splitters 111a, 111b, 111c can be at a substantially equal temperature since the elements 112r, 112g, 112b are disposed near the beam splitters 111a, 111b, 111c. Consequently, the temperature of the one is not affected by that of the other to allow ready temperature control.

With such control and settings, substantially uniform temperature distribution can be achieved in each of the polarization beam splitters 111a, 111b, 111c to produce a projected image of high contrast and high quality.

Next, description is made for the reason why the two hot-air fans F1, F2 are provided and their specific configurations with reference to FIG. 17.

FIG. 17 shows only the polarization beam splitter 111a. Since the polarization beam splitters 111b, 111c have the same configurations, description thereof is omitted.

As shown in FIG. 17, the whole polarization beam splitter 111a is formed in a rectangular parallelepiped or cube shape.

Reference numeral 141 shows the first hot-air fan (F1) which is disposed in opposition to a surface of the polarization beam splitter 111a (top surface thereof in FIG. 17) through which the illumination light from the light source 101 does not transmit (meaning incidence or exit). Reference numeral 142 shows the second hot-air fan (F2) which is disposed in opposition to a surface of the polarization beam splitter 111a (bottom surface thereof in FIG. 17) opposite to the surface above which the first hot-air fan 141 is disposed in opposition. Each of the first and second hot-air fans 141, 142 contains a heat generating coil therein.

Reference numeral 143 shows the first temperature sensor (S1) fixed in contact with the substantially central portion of the surface of the polarization beam splitter 111a to which the first hot-air fan 141 is disposed in opposition. The first temperature sensor 133 detects the temperature of the polarization beam splitter 111a to output an electrical signal (temperature information) to the temperature control circuit D.

Reference numeral 144 shows the second temperature sensor (S2) fixed in contact with the substantially central portion of the surface of the polarization beam splitter 111a to which the second hot-air fan 142 is disposed in opposition. The second temperature sensor 144 detects the temperature of the polarization beam splitter 111a to output an electrical signal (temperature information) to the temperature control circuit D.

Figure 18:
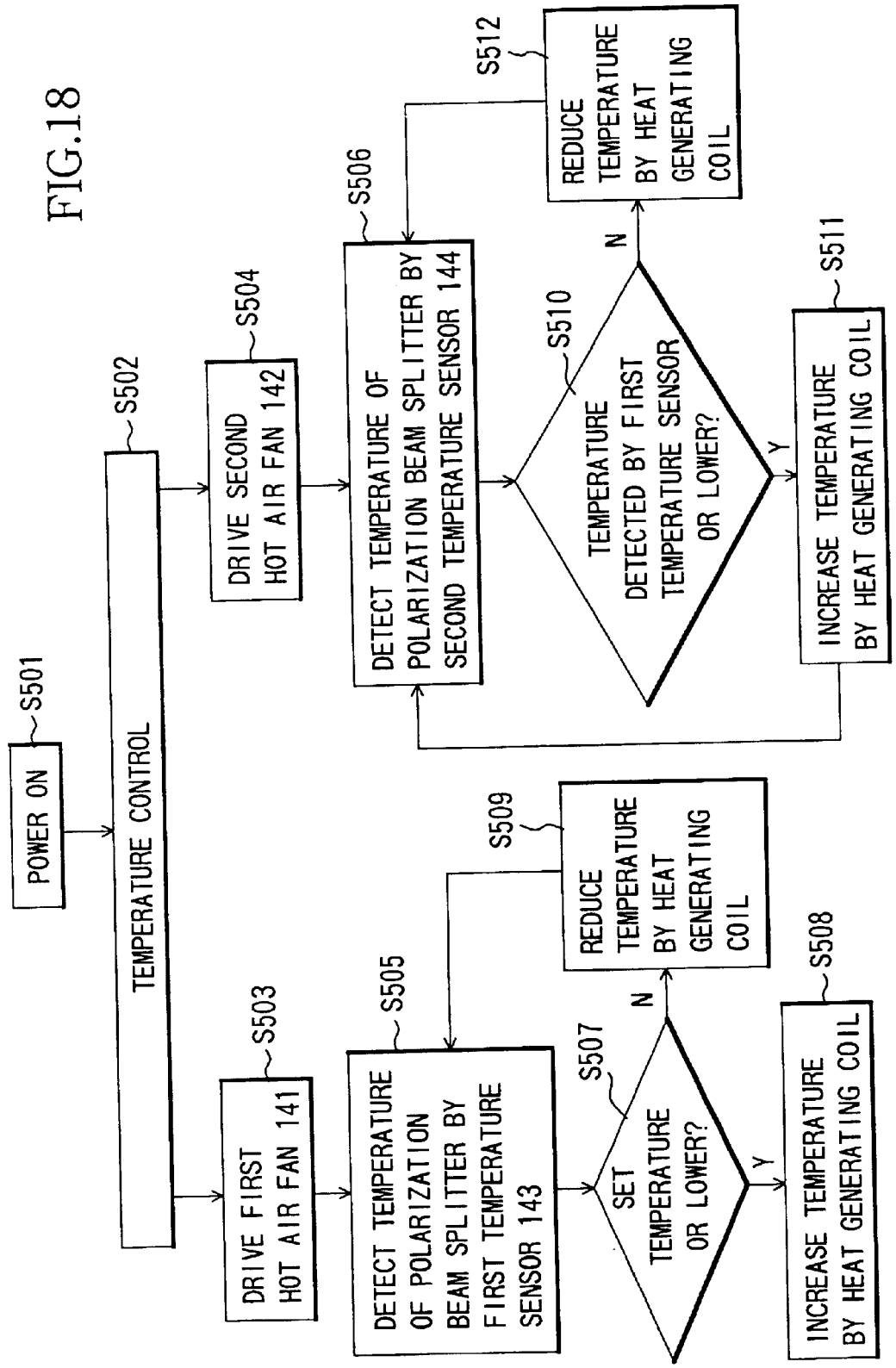
FIG. 18 is a flow chart for temperature control of the polarization beam splitter Embodiment 6.
Figure 19:
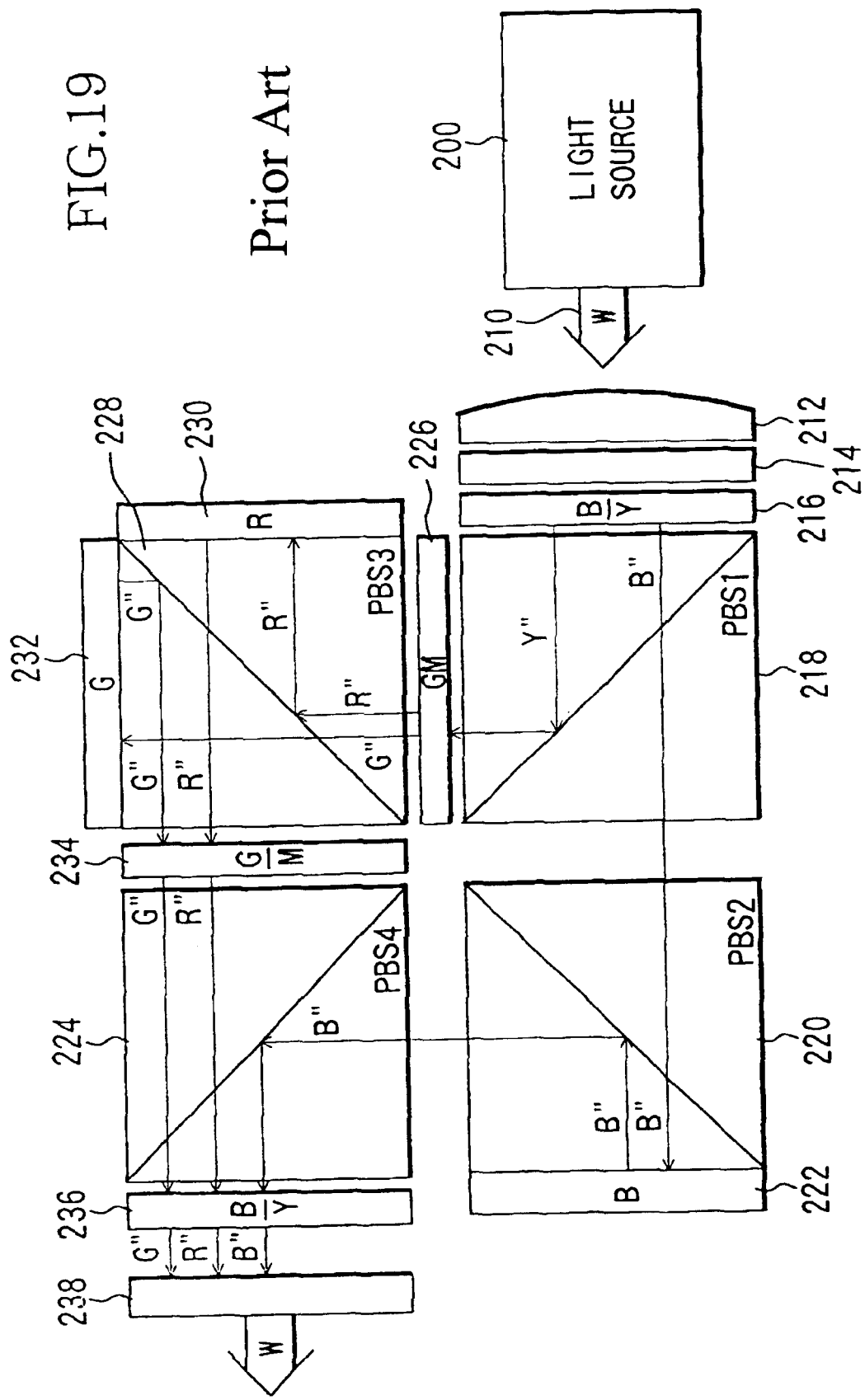
FIG. 19 shows the configuration of a conventional projection type image display apparatus.

Next, the heating control of the polarization beam splitter by the first and second hot-air fans 141, 142 is described with reference to a flow chart of FIG. 18 and FIGS. 16 and 17. Since the heating control of the polarization beam splitters 111b, 111c is identical to that of the polarization beam splitter 111a, description is herein made only for the polarization beam splitter 111a.

Upon turn-on of the power of the image display apparatus (S501), the light source 1 is lit by a main control circuit consisting of a CPU or the like, not shown, responsible for control of the whole display apparatus. Next, the temperature control circuit D starts temperature control (S502), and passes an electric current through the first hot-air fan 141 and the second hot-air fan 142 to drive them (S503, S504). In this event, the first temperature sensor 143 and the second temperature sensor 144 detect the temperature of the polarization beam splitter 111a (S505, S506).

The polarization beam splitter 111a is gradually heated by the illumination light from the light source 101 and the heat generated by the first and second hot-air fans 141, 142. When the temperature detected by the first temperature sensor 143 is equal to or lower than a set temperature value, later described (S507), the temperature control circuit D controls the amount of the passing electric current to increase the heating temperature of the heat generating coil in the first hot-air fan 141 (S508). Then, the first temperature sensor 143 again detects the temperature of the polarization beam splitter 111a (S505).

The aforementioned "set temperature value" refers to the temperature T1 which is the highest temperature of the polarization beam splitter 111a after the illumination light from the light source 101 has been incident on the polarization beam splitter 111a for a long time.

When the temperature detected by the first temperature sensor 143 is a temperature above the set temperature value (S507), the temperature control circuit D controls the amount of the passing electric current to reduce the heating temperature of the heat generating coil in the first hot-air fan 141 (S509). Then, the first temperature sensor 143 again detects the temperature of the polarization beam splitter 111a (S505).

On the other hand, when the temperature detected by the second temperature sensor 144 is equal to or lower than the temperature detected by the first temperature sensor 143 (S510), the temperature control circuit D controls the passing electric current to increase the heating temperature of the heat generating coil in the second hot-air fan 142 (S511). Then, the second temperature sensor 144 again detects the temperature of the polarization beam splitter 111a (S506).

When the temperature detected by the second temperature sensor 144 is above the temperature detected by the first temperature sensor 143 (S510), the temperature control circuit D controls the passing electric current to the reduce the heating temperature of the heat generating coil in the second hot-air fan 142 (S512). Then, the second temperature sensor 144 again detects the temperature of the polarization beam splitter 111a (S506).

With the repetition of such control, the temperature in the whole polarization beam splitter 111a is substantially equalized to the temperature detected by the first temperature sensor 143 (that is, the set temperature T1) to prevent the occurrence of internal stress in the polarization beam splitter 111a and the resulting birefringence.

Substantially uniform distribution of the temperature in each of the three polarization beam splitters 111a, 111b, 111c in this manner can prevent the occurrence of light leakage through each polarized light separating surface to produce a projected image of high contrast and high quality.

While the aforementioned Embodiment 4 to Embodiment 6 have been described for the same components used as the two heating units (the heaters, the Peltier elements, or the hot-air fans), different components may be used in combination as the two heating units.

In addition, while the aforementioned Embodiment 1 to Embodiment 6 have been described for the two cooling units or two heating units provided for each polarization beam splitter, a larger number of cooling units or heating units may be provided to achieve a uniform temperature in the polarization beam splitters.

The configurations of the optical systems described in Embodiment 1 to Embodiment 6 are illustrative only, the present invention is applicable to any optical system which uses at least one polarization beam splitter included therein.

As described above, according to the aforementioned respective embodiments, the plurality of temperature varying units (cooling units or heating units) exert their effects from the different surfaces of the polarization beam splitter, and the cooling or heating by the temperature varying units is controlled on the basis of the detection results of the temperature sensors, thereby making it possible to achieve substantially uniform temperature distribution in the whole polarization beam splitter of large volume. Thus, it is possible to prevent the action of birefringence caused by internal stress in the optical glass material constituting the polarization beam splitter from hindering a desired effect of polarized light separation.

Therefore, an image display optical system or a projection type image display apparatus formed with the color separation/combination optical system can prevent a reduction in contrast and quality of a displayed image due to light leakage when polarized light is separated.

In addition, when the temperature varying unit is controlled such that the temperature of the polarization beam splitters is near the controlled temperature for the image display elements, the image display elements and the polarization beam splitters can be at a substantially equal temperature since the display elements are disposed near the beam splitters. Consequently, the temperature of the one is not affected by that of the other to allow ready temperature control.

The Peltier element, when used as the temperature varying unit, is effective in reducing the size of an optical system or a projection type image display. apparatus and producing a quiet apparatus since the Peltier element has a smaller size than the cooling or hot-air fan and makes no noise.

Furthermore, when the heating unit is used, the following condition is preferably satisfied:

$$T1 \leq T2$$

where T1 represents the temperature of the polarization beam splitter heated by the illumination light from the light source and T2 represents the heating temperature of the heating unit. If the condition is satisfied, an advantage can be taken of the constant heating of the central portion of the polarization beam splitter at T1 by the illumination light to control the heating unit such that the whole polarization beam splitter is at the temperature (T1) or the higher temperature (T2), and thus the heating unit has only to perform auxiliary heating and power savings can be provided.

While preferred embodiments have been described, it is to be understood that modification and variation of the present invention may be made without departing from the sprit or scope of the following claims.

What is claimed is:

1. A color separation/combination optical system which separates illumination light from a light source into light components for a plurality of colors, guides the light components to a plurality of image display elements for respective colors, and combines the light components modulated by said image display elements comprising:

a polarization beam splitter which has a non-incident/non-emergent surface that is a surface other than a light-incident surface and light-emergent surface, a plurality of temperature controlling members, each of which is disposed on the side of the non-incident/non-emergent surface of said polarization beam splitter and controls the temperature of said polarization beam splitter;

a temperature sensor which detects the temperature of said polarization beam splitter; and a control device which controls at least one of said plurality of temperature controlling members based on the temperature detected by said temperature sensor.

2. The color separation/combination optical system according to claim 1, wherein said control device controls said at least one of the plurality of temperature controlling members such that the entirety of said polarization beam splitter is at a substantially uniform temperature.

3. The color separation/combination optical system according to claim 1, wherein said control device controls said at least one of the plurality of temperature controlling member such that the temperature of the central portion of said polarization beam splitter is substantially equal to the temperature of the peripheral portion thereof.

4. The color separation/combination optical system according to claim 1, wherein said control device controls said at least one of the plurality of temperature controlling members such that the temperature of said polarization beam splitter is near a controlled temperature for said image display elements.

5. The color separation/combination optical system according to claim 1, comprising a plurality of said temperature sensors, wherein said control device controls said plurality of temperature controlling members based on a detection result of said plurality of temperature sensors.

6. The color separation/combination optical system according to claim 5, wherein said control device controls said plurality of temperature controlling members such that the detection results of said plurality of temperature sensors are substantially equal to each other.

7. The color separation/combination optical system according to claim 1, wherein said plurality of temperature controlling members are cooling members which cool said polarization beam splitter.

8. The color separation/combination optical system according to claim 7, wherein at least one of said plurality of cooling members is a cooling fan.

9. The color separation/combination optical system according to claim 7, wherein at least one of said plurality of cooling members is a Peltier element having a surface which radiates or absorbs heat in contact with said polarization beam splitter.

10. The color separation/combination optical system according to claim 7, wherein at least one of said plurality of cooling members is a cooling fan, and at least one of the remaining said cooling members is a Peltier element having a surface which radiates or absorbs heat in contact with said polarization beam splitter.

11. The color separation/combination optical system according to claim 7, wherein at least one of said plurality of cooling members is a cooling fan, and at least one of the remaining cooling members is a radiating member.

12. The color separation/combination optical system according to claim 7, wherein at least one of said plurality of cooling members is a Peltier element having a surface which radiates or absorbs heat in contact with said polarization beam splitter, and at least one of the remaining cooling members is a radiating member.

13. The color separation/combination optical system according to claim 1, wherein said plurality of temperature controlling members are heating members which heat said polarization beam splitter.

14. The color separation/combination optical system according to claim 13, wherein the following condition is satisfied:

$$T1 \leq T2$$

where T1 represents the temperature of said polarization beam splitter heated by the illumination light from said light source and T2 represents the heating temperature of said heating members.

15. The color separation/combination optical system according to claim 13, wherein at least one of said plurality of heating members is a heater.

16. The color separation/combination optical system according to claim 13, wherein, at least one of said plurality of heating members is a hot-air fan.

17. The color separation/combination optical system according to claim 13, wherein at least one of said plurality of heating members is a Peltier element having a surface which generates heat in contact with said polarization beam splitter.

18. The color separation/combination optical system according to claim 13, wherein at least one of said plurality of heating members is a hot-air fan, and at least one of the remaining heating members is a Peltier element having a surface which generates heat in contact with said polarization beam splitter.

19. An image display optical system comprising:

a light source;

the color separation/combination optical system according to claim 1; and a projection optical system which projects light from said color separation/combination optical system onto a projection surface.

20. A projection type image display apparatus comprising: the image display optical system according to claim 19; and said plurality of image display elements.

21. A polarization splitting optical system comprising:

a polarization beam splitter which has a non-incident/non-emergent surface that is a surface other than a light-incident surface and light-emergent surface;

a plurality of temperature controlling members, each of which is disposed on the side of said non-incident/non-emergent surface with respect to said polarization beam splitter, and controls the temperature of said polarization beam splitter;

a temperature sensor which detects the temperature of said polarization beam splitter; and a control device which controls at least one of said plurality of temperature controlling members based on the temperature detected by said temperature sensor.

22. A color separation/combination optical system which separates illumination light from a light source into light components for a plurality of colors, guides the light components to a plurality of image display elements for respective colors, and combines the light components modulated by said image display elements, comprising:

a polarization beam splitter which has a non-incident/non-emergent surface that is a surface other than a light-incident surface and light-emergent surface; and a plurality of temperature controlling members, each of which is disposed on the side of the non-incident/non-emergent surface of said polarization beam splitter and controls the temperature of said polarization beam splitter.

23. The color separation/combination optical system according to claim 22, wherein said plurality of temperature controlling members controls the temperature of said polarization beam splitter such that the temperature of the entirety of said polarization beam splitter is substantially uniform.

24. The color separation/combination optical system according to claim 22, wherein said plurality of temperature controlling members controls the temperature of said polarization beam splitter such that the temperature of the central portion of said polarization beam splitter is substantially equal to the temperature of the peripheral portion thereof.

25. The color separation/combination optical system according to claim 22, wherein said plurality of temperature controlling members controls the temperature such that the temperature of said polarization beam splitter is near a controlled temperature for said image display elements.

26. An image display optical system comprising:
   a light source;
   the color separation/combination optical system according to claim 22; and
   a projection optical system which projects light from said color separation/combination optical system onto a projection surface.

27. A projection type image display apparatus comprising:
   the image display optical system according to claim 26; and
   said plurality of image display elements.

28. A projection splitting optical system comprising:
   a polarization beam splitter which has a non-incident/non-emergent surface that is a surface other than a light-incident surface and light-emergent surface; and
   a plurality of temperature controlling members, each of which is disposed on the side of said non-incident/non-emergent surface of said polarization beam splitter and controls the temperature of said polarization beam splitter.

29. A color separation/combination optical system, which separates illumination light from a light source into light components for a plurality of colors, guides the light components to a plurality of image display elements for respective colors, and combines the light components modulated by said image display elements, comprising:
   an optical member which has a non-incident/non-emergent surface that is a surface other than a light-incident surface and light-emergent surface;
   a plurality of temperature controlling members, each of which is disposed on the side of said non-incident/non-emergent surface of said optical member and controls the temperature of said optical member;
   a temperature sensor which detects the temperature of said optical member; and
   a control device which controls at least one of said plurality of temperature controlling members based on the temperature detected by said temperature sensor.

30. A color separation/combination optical system, which separates illumination light from a light source into light components for a plurality of colors, guides the light components to a plurality of image display elements for respective colors, and combines the light components modulated by said image display elements, comprising:
   an optical member which has a non-incident/non-emergent surface that is a surface other than a light-incident surface and light-emergent surface; and
   a plurality of temperature controlling members, each of which is disposed on the side of said non-incident/non-emergent surface of said optical member and controls the temperature of said optical member.

* * * * *